(12) United States Patent
Ji

(10) Patent No.: US 11,060,862 B2
(45) Date of Patent: Jul. 13, 2021

(54) APPARATUS FOR SENSING ROTATION

(71) Applicant: Samsung Electro-Mechanics Co., Ltd., Suwon-si (KR)

(72) Inventor: Yong Woon Ji, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 24 days.

(21) Appl. No.: 16/729,834

(22) Filed: Dec. 30, 2019

(65) Prior Publication Data

US 2021/0063149 A1 Mar. 4, 2021

(30) Foreign Application Priority Data

Sep. 4, 2019 (KR) .................. 10-2019-0109395

(51) Int. Cl.
*G01B 21/24* (2006.01)
*G01D 5/12* (2006.01)

(52) U.S. Cl.
CPC ............... *G01B 21/24* (2013.01); *G01D 5/12* (2013.01)

(58) Field of Classification Search
CPC .................................. G01D 5/12; G01B 21/24
See application file for complete search history.

(56) References Cited

U.S. PATENT DOCUMENTS

| 5,365,458 A | * | 11/1994 | Tamura | ............. G01B 7/312 700/279 |
| 2003/0142073 A1 | * | 7/2003 | Fukushima | ............. G06F 3/046 345/158 |
| 2009/0251134 A1 | | 10/2009 | Uenoyama | |
| 2011/0031836 A1 | * | 2/2011 | Nussbaumer | ....... F16C 32/0444 310/90.5 |
| 2016/0069712 A1 | | 3/2016 | Holenarsipur et al. | |
| 2017/0089735 A1 | * | 3/2017 | Ruh | ............. G06F 3/0346 |
| 2017/0322022 A1 | * | 11/2017 | Sagemueller | ......... G01L 5/0009 |

FOREIGN PATENT DOCUMENTS

| JP | 2002260488 | * | 2/2002 | ........... B60Q 1/26 |
| JP | 4577396 B2 | | 11/2010 | |
| JP | 6402863 B2 | | 10/2018 | |

* cited by examiner

*Primary Examiner* — Alexander Satanovsky
(74) *Attorney, Agent, or Firm* — NSIP Law

(57) ABSTRACT

An apparatus for sensing rotation may include: a pattern portion connected to a rotator, and including patterns extending in a rotation direction of the rotator; a sensor group disposed opposite to the pattern portion, and configured to sense rotation of the rotator; and a rotation information calculator configured to calculate rotation information in response to a sensing signal output from the sensor group and measured by the rotation of the rotator during a single interval. The rotation information calculator may include a tilting determiner configured to compare one or more of peak values of the sensing signal with a maximum value of reference data or a minimum value of the reference data, and determine whether tilting occurs. The reference data may include unique data corresponding to a reference of an initial determination of whether tilting has occurred, and update data updated when tilting occurs.

17 Claims, 17 Drawing Sheets

APPARATUS FOR SENSING ROTATION

CROSS-REFERENCE TO RELATED APPLICATIONS

This application claims the benefit under 35 U.S.C. § 119(a) of Korean Patent Application No. 10-2019-0109395 filed on Sep. 4, 2019 in the Korean Intellectual Property Office, the entire disclosure of which is incorporated herein by reference for all purposes.

BACKGROUND

1. Field

The following description relates to an apparatus for sensing rotation.

2. Description of Related Art

A rotator has been applied to use in a variety of technological applications such as a motor and a wheel switch of a wearable device required to have a reduced size. In accordance with such a trend, a sensing circuit for sensing a position of a rotator may also be required to sense a fine displacement of a rotator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an apparatus for sensing rotation includes: a pattern portion connected to a rotator, and including patterns extending in a rotation direction of the rotator; a sensor group disposed opposite to the pattern portion, and configured to sense rotation of the rotator; and a rotation information calculator configured to calculate rotation information in response to a sensing signal output from the sensor group and measured by the rotation of the rotator during a single interval. The rotation information calculator includes a tilting determiner configured to compare one or more of peak values of the sensing signal with a maximum value of reference data or a minimum value of the reference data, and determine whether tilting occurs. The reference data includes unique data corresponding to a reference of an initial determination of whether tilting has occurred, and update data updated when tilting occurs.

The peak values of the sensing signal may be detected when the sensor group is closest to each of the patterns.

The tilting determiner may be further configured to determine that tilting occurs, in response to one or more of the peak values of the sensing signal being greater than the maximum value of the reference data or less than the minimum value of the reference data.

The tilting determiner may be further configured to determine that tilting occurs in a first direction, in response to one or more of the peak values of the sensing signal being greater than the maximum value of the reference data. The tilting determiner may be further configured to determine that tilting occurs in a second direction different from the first direction, in response to one or more of the peak values of the sensing signal being less than the minimum value of the reference data.

The tilting determiner may be further configured to compare the unique data with the peak values of the sensing signal, in response to tilting having not occurred before the determining of whether tilting occurs.

The tilting determiner may be further configured to compare the update data with the peak values of the sensing signal, in response to tilting having occurred before the determining of whether tilting occurs.

The update data may include peak values of a previous sensing signal measured when tilting is lastly measured before the determining of whether tilting occurs.

The tilting determiner may be further configured to update the update data to the peak values of the sensing signal, in response to determining that tilting occurs.

The determiner may be further configured to use the update data updated to the peak values of the sensing signal as the reference data until subsequent tilting occurs.

The rotation information calculator may further include a tilting direction/ratio determiner configured to determine a tilting direction and a tilting ratio by comparing a maximum value of the peak values of the sensing signal with a maximum value of the unique data, in response to tilting occurring in the first direction according to a determination result of the tilting determiner, and comparing a minimum value of the peak values of the sensing signal with a minimum value of the unique data, in response to tilting occurring in the second direction according to the determination result of the tilting determiner.

The tilting direction/ratio determiner may be further configured to determine that tilting occurs in the first direction, in response to the maximum value of the peak values of the sensing signal being greater than the maximum value of the unique data. The tilting direction/ratio determiner may be further configured to determine that tilting occurs in the second direction, in response to the maximum value of the peak values of the sensing signal being less than the maximum value of the unique data.

The tilting direction/ratio determiner may be further configured to determine the tilting ratio in accordance with a difference between the maximum value of the peak values of the sensing signal and the maximum value of the unique data.

The tilting direction/ratio determiner may be further configured to determine that tilting occurs in the first direction, in response to the minimum value of the peak values of the sensing signal being greater than the minimum value of the unique data. The tilting direction/ratio determiner may be further configured to determine that tilting occurs in the second direction, in response to the minimum value of the peak values of the sensing signal being less than the minimum value of the unique data.

The tilting direction/ratio determiner may be further configured to determine the tilting ratio in accordance with a difference between the minimum value of the peak values of the sensing signal and the minimum value of the unique data.

The rotation information calculator may be further configured to calculate a compensation parameter in accordance with the tilting direction and the tilting ratio, and apply the compensation parameter to the sensing signal.

The rotation information calculator may be further configured to apply the compensation parameter to a sensing signal measured after titling occurs, until subsequent tilting occurs.

A wearable electronic device may include the apparatus for sensing rotation described above.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
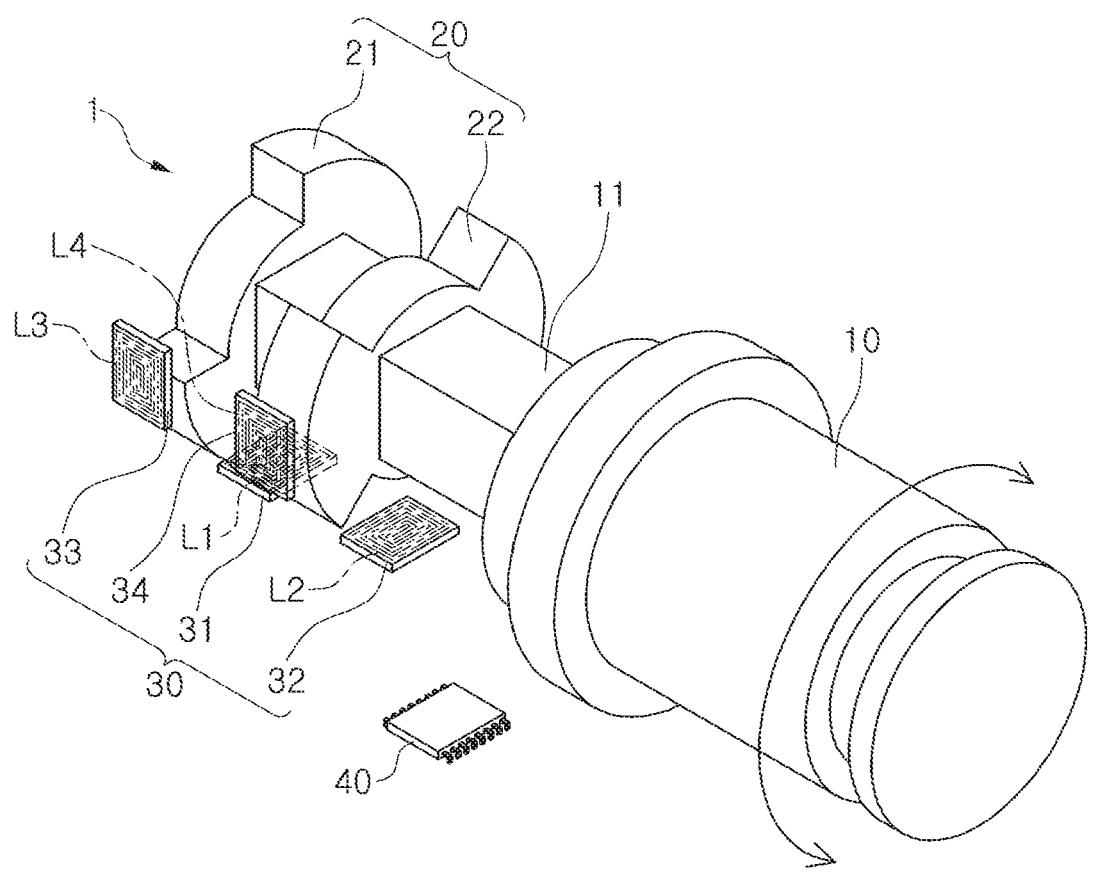
FIG. 1A is a diagram illustrating an apparatus for sensing rotation, according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

According to an aspect of the following description, an apparatus that may accurately sense rotation of a rotator by compensating for tilting is disclosed. The apparatus may be implemented, for example, in an electronic device such as a wearable electronic device.

Figure 1B:
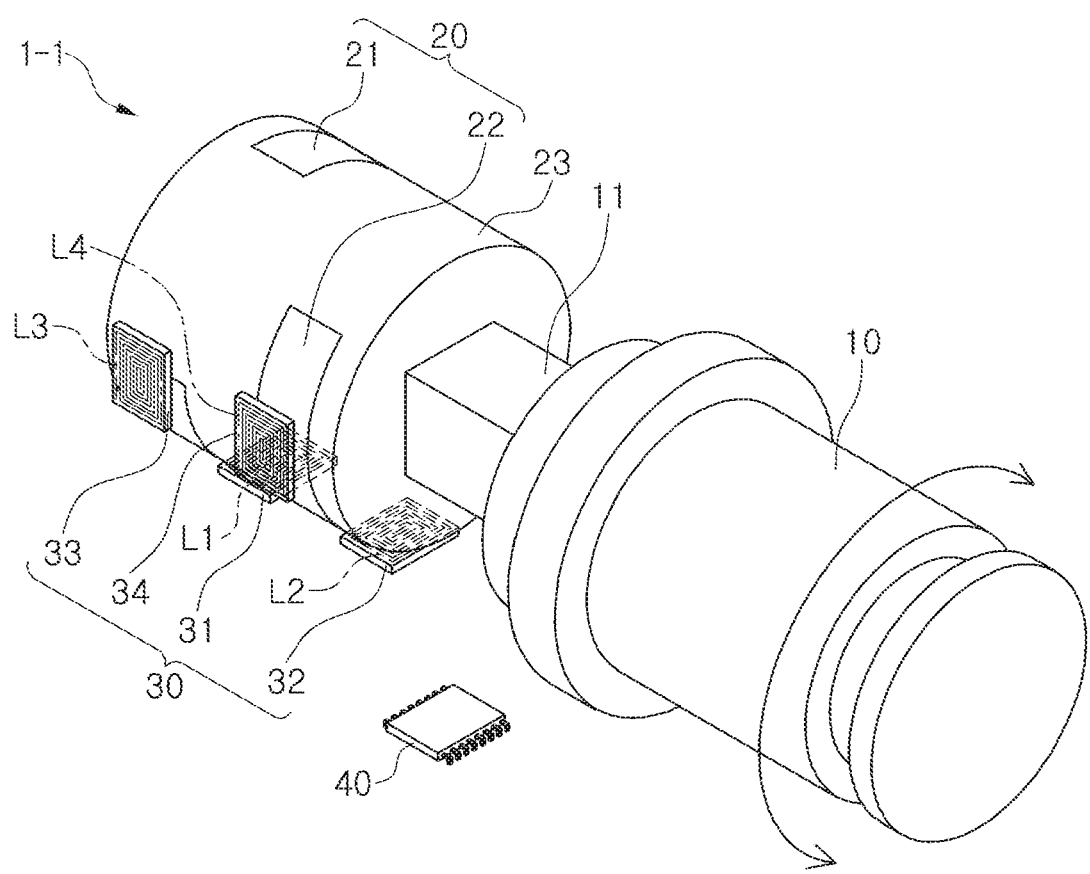
FIG. 1B is a diagram illustrating a modified example of an apparatus for sensing rotation, according to an embodiment.
Figure 2A:
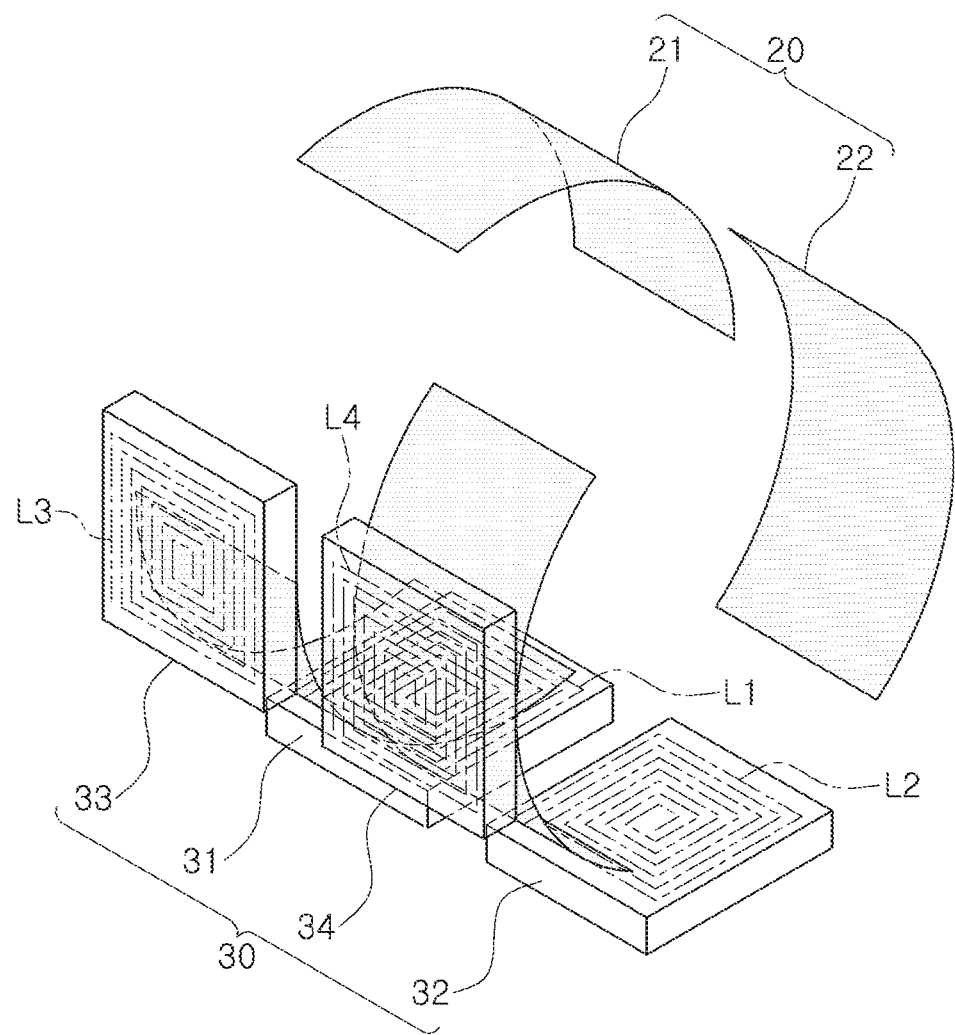
FIG. 2A is a diagram illustrating pattern portions and a sensor group, according to an embodiment.
Figure 2B:
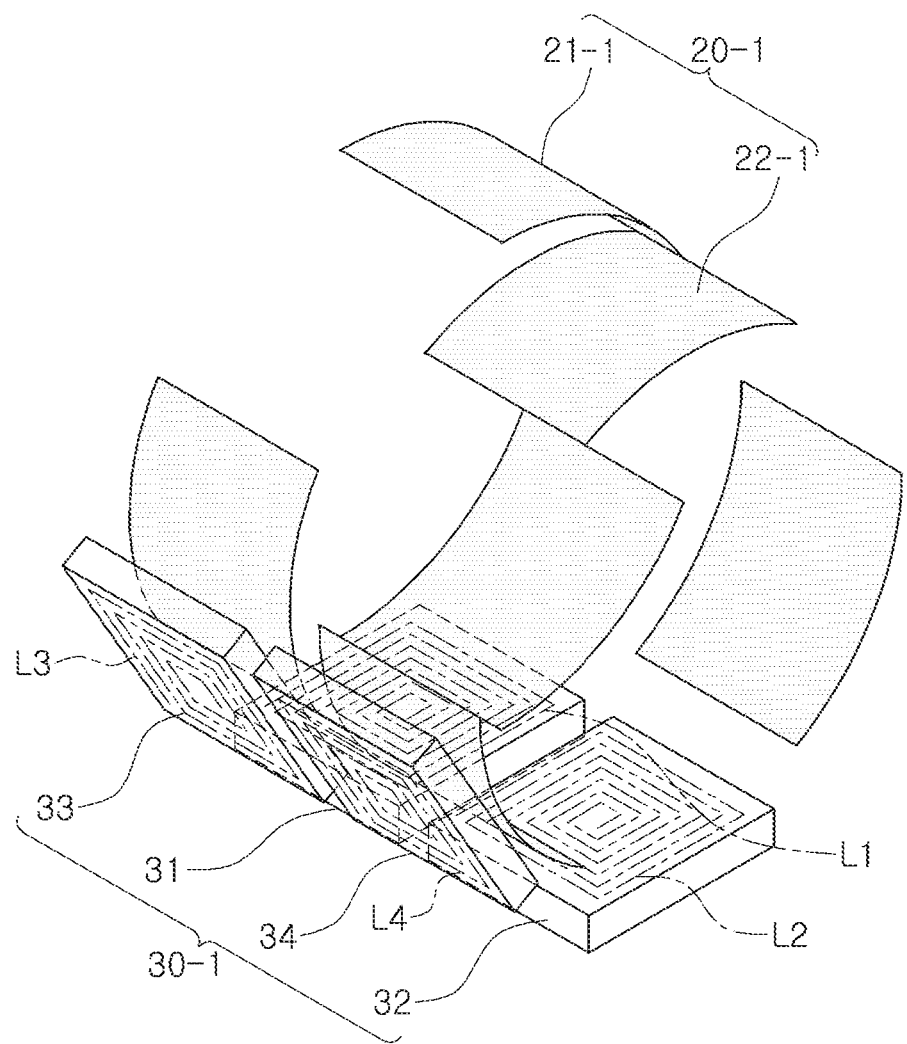
FIG. 2B is a diagram illustrating pattern portions and a sensor group, according to an embodiment.

FIG. 1A is a diagram illustrating an apparatus 1 for sensing rotation, according to an embodiment. FIG. 1B is a diagram illustrating a modified example of an apparatus 1-1 for sensing rotation, according to an embodiment. FIG. 2A is a diagram illustrating pattern portions 21 and 22, and a sensor group 30, according to an example. FIG. 2B is a diagram illustrating pattern portions 21-1 and 22-1 and a sensor group 30-1, according to an example.

As shown in FIGS. 1A and 1B, an apparatus 1/1-1 for sensing rotation may include a detection target 20, the sensor group 30, and a rotation information calculator 40.

Referring to FIG. 1A, the detection target 20 may be connected to a wheel 10 through a rotary shaft 11. The wheel 10 may be implemented as a rotator employed in an electronic device and rotating in a clockwise direction or an anti-clockwise direction by a user. The detection target 20 may rotate in the clockwise direction or the anti-clockwise direction along with the wheel 10.

The detection target 20 may include the first pattern portion 21 and the second pattern portion 22. The first pattern portion 21 and the second pattern portion 22 may be configured to have the same shape, may be spaced apart from each other in a direction in which the rotary shaft 11 extends (e.g., a direction of a rotational axis ("rotational axis direction") of the rotary shaft 11), and may be coupled to the rotary shaft 11. The first pattern portion 21 and the second pattern portion 22, when coupled to the rotary shaft 11, may rotate in the same direction and at the same speed as the rotator/wheel 10.

Each of the first pattern portion 21 and the second pattern portion 22 may include patterns having the same shape. The first pattern portion 21 may include first patterns, and the second pattern portion 22 may include second patterns.

In the example embodiment illustrated in FIG. 1A, protruding regions of the first pattern portion 21 and the second pattern portion 22 may correspond to the patterns. As an example, the first patterns of the first pattern portion 21 and the second patterns of the second pattern portion 22 may be manufactured by forming serrations by processing a metal and a magnetic material having circular plate shapes. Thus, the first patterns of the first pattern portion 21 and the second patterns of the second pattern portion 22 may be formed of one of a metal and a magnetic material.

The first patterns of the first pattern portion 21 may extend in a rotation direction, and the second patterns of the second pattern portion 22 may also extend in the rotation direction. An extended length of the first pattern taken in a rotation direction may be defined as a size of the first pattern, and an extended length of the second pattern taken in a rotation direction may be defined as a size of the second pattern.

The first patterns of the first pattern portion 21 may be spaced apart from each other by a reference angle in a rotation direction, and the second patterns of the second pattern portion 22 may also be spaced apart from each other by a reference angle in a rotation direction. As an example, a spacing distance between the first patterns of the first pattern portion 21 may be the same as a size of the first pattern, and a spacing distance between the second patterns of the second pattern portion 22 may be the same as a size of the second pattern.

As an example, referring to FIG. 2A, the reference angle may be 90°. Accordingly, each of the first patterns of the first pattern portion 21 may have a size corresponding to 90°, which is the reference angle, and a spacing distance between the first patterns may correspond to 90°. Thus, the first pattern portion 21 may include two first patterns each having a size of 90°, which is the reference angle. Similarly, each of the second patterns of the second pattern portion 22 may have a size corresponding to 90° and a spacing distance between the second patterns may correspond to 90° Thus, the second pattern portion 22 may include two second patterns each having a size of 90°.

As another example, referring to FIG. 2B, the reference angle may be 60°. Accordingly, the first pattern portion 21-1 of the detection target 20-1 may include three first patterns each having a size of 60°, which is the reference angle, and the second pattern portion 22-1 may also include three second patterns each having a size of 60°.

In the description below, an example embodiment will be described under an assumption that the first pattern portion 21 may include two first patterns each having a size of 90°, which is the reference angle, and the second pattern portion 22 may include two second patterns each having a size of 90°, for ease of description. In example embodiments, a size and the number of each of the first pattern portion 21 and the second pattern portion 22 may be varied.

The first patterns of the first pattern portion 21 and the second patterns of the second pattern portion 22 may be disposed with an angle difference therebetween. As an example, the first patterns of the first pattern portion 21 and the second patterns of the second pattern portion 22 may be disposed with an angle difference of a half of the reference angle therebetween.

When the first pattern portion 21 includes two first patterns each having a size of 90°, the reference angle, and the second pattern portion 22 includes two second patterns each having a size of 90°, the reference angle, the first patterns of the first pattern portion 21 and the second patterns of the second pattern portion 22 may be disposed with an angle difference of 45°, corresponding to a half of the reference angle, therebetween. Accordingly, the first patterns of the first pattern portion 21 and the second patterns of the second pattern portion 22 may partially overlap each other in a direction in which the rotary shaft 11 extends.

The sensor group 30 may include sensors. As an example, referring to FIGS. 1A and 1B, the sensor group 30 may include a first sensor 31, a second sensor 32, a third sensor 33, and a fourth sensor 34.

Referring to FIG. 1A, the angle difference between the first pattern portion 21 and the second pattern portion 22, a sensing signal output from the first sensor 31 and a sensing signal output from the second sensor 32 may have a phase difference of 90° therebetween. Also, a sensing signal output from the third sensor 33 and a sensing signal output from the fourth sensor 34 may have a phase difference of 90° therebetween.

When the sensor group 30 includes the first sensor 31, the second sensor 32, the third sensor 33, and the fourth sensor 34, the apparatus 1 for sensing rotation may calculate rotation information including a rotation direction and a rotation angle, and may perform operations of tilting compensation and deviation compensation.

In an example, the sensor group 30 may only include the first sensor 31 and the second sensor 32. When the sensor group 30 only includes the first sensor 31 and the second sensor 32, the apparatus 1 for sensing rotation may calculate rotation information including a rotation angle, and may perform an operation of tilting compensation.

In the description below, an operation of the apparatus 1 for sensing rotation will be described under the assumption that the sensor group 30 may include the first sensor 31, the second sensor 32, the third sensor 33, and the fourth sensor 34. In another example embodiment, however, the sensor group 30 may only include the first sensor 31 and the second sensor 32.

The first sensor 31 and the second sensor 32 may be disposed in a row in a rotational axis direction of the rotary shaft 11, on a first plane. The first sensor 31 may oppose the first pattern portion 21, and the second sensor 32 may oppose the second pattern portion 22. The third sensor 33 and the fourth sensor 34 may be disposed in a row in the rotational axis direction of the rotary shaft 11, on a second plane. The third sensor 33 may oppose the first pattern portion 21, and the fourth sensor 34 may oppose the second pattern portion 22. The first plane and the second plane may be disposed with an angle difference therebetween that is the same as the reference angle.

By rotation of the first pattern portion 21 and the second pattern portion 22, an area of each of the first sensor 31 and the third sensor 33, overlapping the first pattern of the first pattern portion 21, may change, and an area of each of the second sensor 32 and the fourth sensor 34, overlapping the second pattern of the second pattern portion 22, may change. The first sensor 31 and the third sensor 33 may sense a change of an area of overlap with the first pattern portion 21, and the second sensor 32 and the fourth sensor 34 may sense a change of an area of overlap with the second pattern portion 22.

Each of the first sensor 31, the second sensor 32, the third sensor 33, and the fourth sensor 34 may have a size corresponding to a half of the reference angle. A size of each of the first sensor 31, the second sensor 32, the third sensor 33, and the fourth sensor 34 may be understood as a length in a direction in which the rotator/wheel 10 rotates.

The first sensor 31 and the third sensor 33 may be disposed with an angle difference the same as the reference angle therebetween, and the second sensor 32 and the fourth sensor 34 may be disposed with an angle difference the same as the reference angle therebetween. In other words, as the first sensor 31 and the third sensor 33 are disposed with an angle difference the same as a size of the first pattern, a sensing signal output from the first sensor 31 and a sensing signal output from the third sensor 33 may have a phase difference of 180° therebetween. Also, as the second sensor 32 and the fourth sensor 34 are disposed with an angle difference the same as a size of the second pattern, a sensing signal output from the second sensor 32 and a sensing signal output from the fourth sensor 34 may have a phase difference of 180° therebetween.

As an example, when the reference angle is 90°, the first pattern portion 21 includes two first patterns each having a size corresponding to 90° and a spacing distance corresponding to 90°, and the second pattern portion 22 includes two second patterns each having a size corresponding to 90° and a spacing distance corresponding to 90°, the third sensor 33 may be disposed to have an angle difference of 90° with the first sensor 31, and the fourth sensor 34 may be disposed to have an angle difference of 90° with the second sensor 32, as illustrated in FIG. 2A.

Referring to FIG. 2B, as another example, when the reference angle is 60°, the first pattern portion 21-1 includes three first patterns each having a size corresponding to 60 and a spacing distance corresponding to 60°, and the second pattern portion 22-1 includes three second patterns each having a size corresponding to 60° and a spacing distance corresponding to 60°, the third sensor 33 may be disposed to have an angle difference of 60° with the first sensor 31, and the fourth sensor 34 may be disposed to have an angle difference of 60° with the second sensor 32.

In the above-described embodiments, the first sensor 31 and the second sensor 32 may be disposed on the first plane, the third sensor 33 and the fourth sensor 34 may be disposed on the second plane having an angle difference the same as the reference angle with the first plane, and the first patterns of the first pattern portion 21/21-1 and the second patterns of the second pattern portion 22/22-1 may have an angle difference the same as a half of the reference angle. However, the disclosure is not limited to the foregoing embodiments. In other embodiments, the first patterns of the first pattern portion 21/21-1 and the second patterns of the second pattern portion 22/22-1 may be disposed at the same position without an angle difference therebetween, the first sensor 31 and the second sensor 32 may be disposed to have an angle difference the same as a half of the reference angle, and the third sensor 33 and the fourth sensor 34 may be disposed to have an angle difference the same as a half of the reference angle.

As shown in FIGS. 1A and 1B, the first sensor 31, the second sensor 32, the third sensor 33, and the fourth sensor 34 may include sensing coils L1, L2, L3, and L4, respectively. The sensing coils L1, L2, L3, and L4 may be arranged by forming circuit patterns on a substrate. In example embodiments, each of the sensing coils L1, L2, L3, and L4 may be configured as one of a wound-type inductor coil or a solenoid coil. The first sensor 31, the second sensor 32, the third sensor 33, and the fourth sensor 34 including the sensing coils L1, L2, L3, and L4, respectively, may sense a rotation angle and a rotation direction of the rotator/wheel 10 in accordance with inductance changing according to an area of overlap with the first pattern portion 21/21-1 and the second pattern portion 22/22-1.

The rotation information calculator 40 may be implemented as an integrated circuit and may be electrically connected to the first sensor 31, the second sensor 32, the third sensor 33, and the fourth sensor 34. The rotation information calculator 40 may calculate rotation information including a rotation direction and a rotation angle of the rotator/wheel 10 in accordance with changes in inductance of the first sensor 31, the second sensor 32, the third sensor 33, and the fourth sensor 34.

Referring to FIG. 1B, in comparison to the apparatus 1 for sensing rotation illustrated in FIG. 1A, the apparatus 1-1 for sensing rotation may further include a support member 23 connected to the rotary shaft 11. As the apparatus 1-1 may be similar to the apparatus 1 in the embodiment illustrated in FIG. 1A, overlapping descriptions will not be provided, and mainly differences included in the apparatus 1-1 will be described.

The support member 23 may be connected to the rotary shaft 11, and may rotate in a clockwise direction or an anti-clockwise direction about the rotary shaft 11 in accordance with rotation of the rotator/wheel 10. As an example, the support member 23 may have a cylindrical shape. The detection target 20 may be disposed in the support member 23. The detection target 20 may include the first pattern portion 21 and the second pattern portion 22 disposed on a side surface of the support member 23.

The first pattern portion 21 may include the first patterns extending in a rotation direction in a region at a first height of the support member 23, and the second pattern portion 22 may include the second patterns extending in the rotation direction in a region at a second height of the support member 23. The first patterns of the first pattern portion 21 and the second patterns of the second pattern portion 22 may be formed of one of a metal and a magnetic material.

The support member 23 may be formed of a non-metallic material such as plastic, and the first pattern portion 21 and the second pattern portion 22 may be formed of a metal. The support member 23 may be manufactured through a process of injecting-molding of plastic, and the first pattern portion 21 and the second pattern portion 22 may be formed by a plating process.

The first pattern portion 21 and the second pattern portion 22 may be disposed on a side surface of the support member 23. For example, grooves may be disposed on the side surface of the support member 23 and may extend in the rotation direction, and the first pattern portion 21 and the second pattern portion 22 may be respectively disposed in the grooves. As an example, by including the grooves extending in the rotation direction, the support member 23 may have a stepped portion. The first pattern portion 21 and the second pattern portion 22 may be disposed in the grooves such that the first pattern portion 21 and the second pattern portion 22 are externally exposed. As an example, a thickness of each of the first pattern portion 21 and the second pattern portion 22 may be the same as a depth of each of the grooves.

In the apparatuses 1 and 1-1, the first and second patterns may each be manufactured to have a reduced thickness by processes having excellent mass-production properties, such as an injection molding process and a plating process, such that the apparatuses 1 and 1-1 may be mass-produced and costs for manufacturing the apparatus 1 and 1-1 may be reduced.

Figure 3:
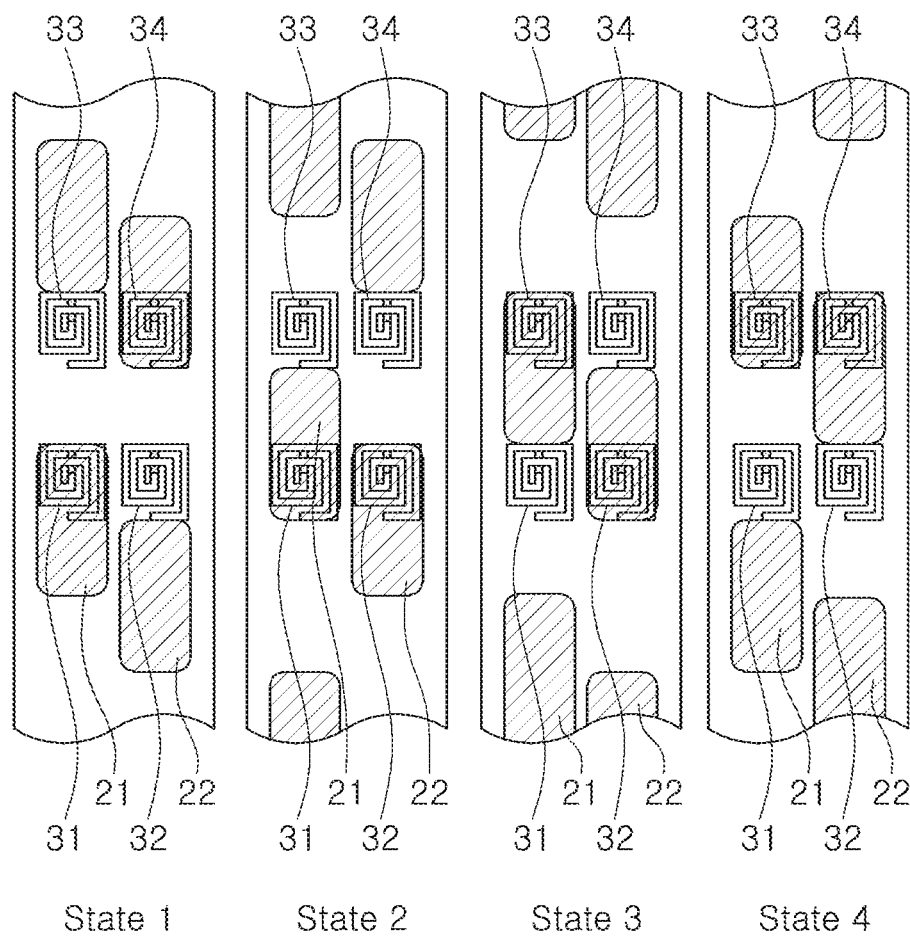
FIG. 3 is a diagram illustrating a positional relationship between a detection target and a sensor group, in accordance with rotation of the detection target, according to an embodiment.
Figure 4:
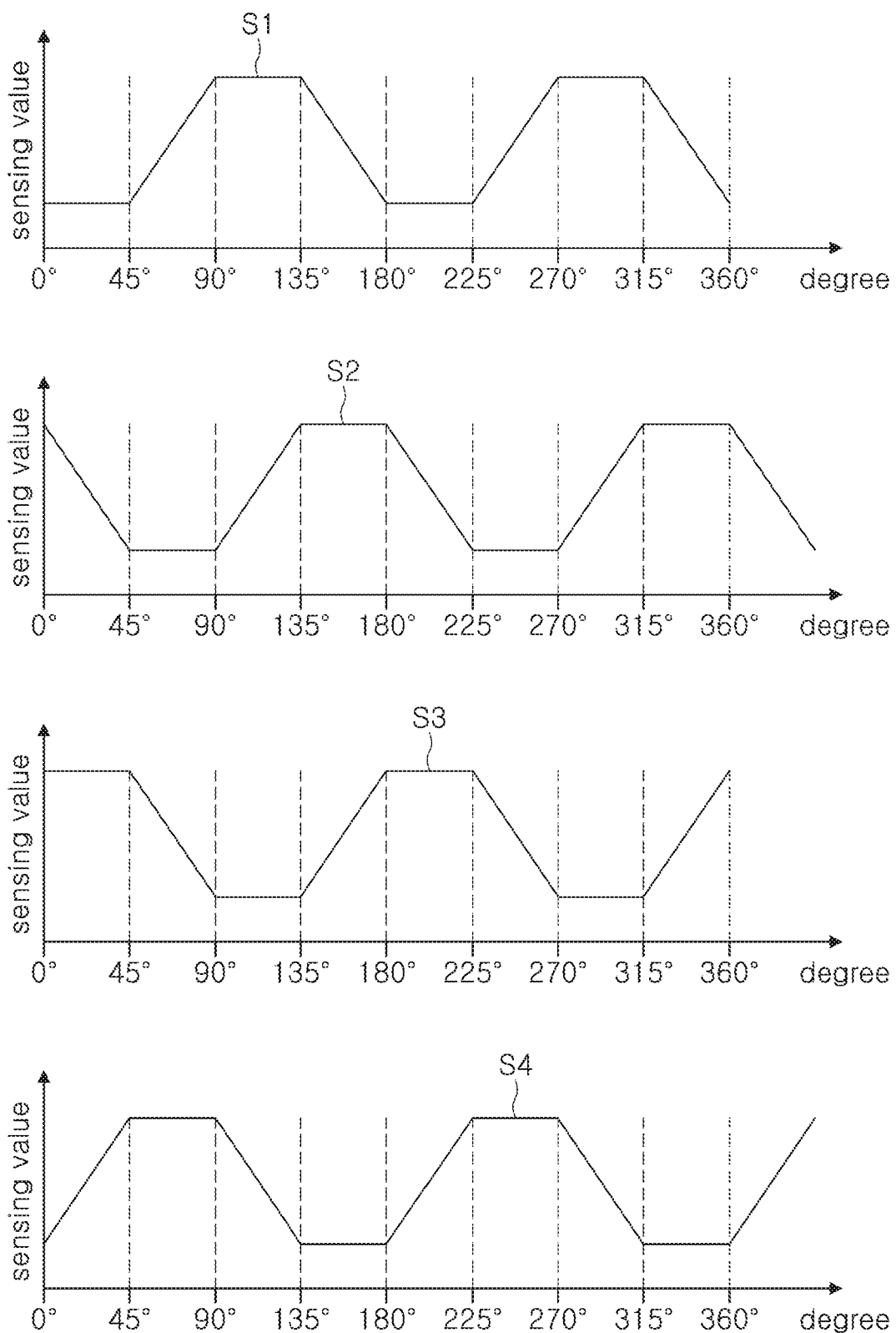
FIG. 4 is a graph illustrating a sensing signal measured by a sensor group, in accordance with rotation of a detection target, according to an embodiment.

FIG. 3 is a diagram illustrating a positional relationship between a detection target and a sensor group 30 in accordance with rotation of the detection target 20, according to an embodiment. FIG. 4 is a graph illustrating a sensing signal measured by the sensor group 30, in accordance with rotation of the detection target 20, according to an embodiment. In FIG. 3, each of a first sensor 31 and a second sensor 32 may be configured to have a form of a sensing coil, an example.

Referring to FIG. 3, an area of overlap between the detection target 20 and the sensor group 30 may change by rotation of the rotator/wheel 10. For example, an area of overlap between the first pattern portion 21 and the first sensor 31 and a third sensor 33, and an area of overlap between the second pattern portion 22 and a second sensor 32 and a fourth sensor 34 may change. As the area of overlap between the first pattern portion 21 and the first sensor 31 changes, a sensing signal S1 of the first sensor 31 may change. As the area of overlap between the first pattern portion 21 and the third sensor 33 changes, a sensing signal S3 of the third sensor 33 may change. As the area of overlap between the second pattern portion 22 and the second sensor 32 changes, a sensing signal S2 of the second sensor 32 may change. As the area of overlap between the second sensor 32 and the fourth sensor 34 changes, a sensing signal S4 of the fourth sensor 34 may change. The sensing signals S1 to S4 of the first to fourth sensors may correspond to inductance.

In the description below, a change of the sensing signal S1 in accordance with a change of an area of overlap between the first pattern portion 21 and the first sensor 31 will be described for ease of description. The description below may also be applied to changes of sensing signals of the other sensors.

In FIG. 3, it may be assumed that the first pattern portion 21 and the second pattern portion 22 rotate in a direction from a lower side to an upper side. In a first state State 1, the first sensor 31 may overlap the first pattern portion 21. When the first pattern portion 21, which is formed of a metal material, is adjacent to the first sensor 31, which is configured as a sensing coil, a current may be applied to the first pattern portion 21 by magnetic flux generated from the sensing coil, and magnetic flux may be generated in the first pattern portion 21 by the current applied to the first pattern portion 21. The magnetic flux generated in the first pattern portion 21 may offset the magnetic flux of the sensing coil of the first sensor 31 such that inductance of the sensing coil of the first sensor 31 may decrease. Thus, referring to the 0° rotation position in FIG. 4, corresponding to the first state State 1, the sensing signal S1 of the first sensor 31 may correspond to a low level.

After the first state State 1, the first pattern portion 21 may rotate in a direction from a lower side to an upper side, and in a second state State 2, the first sensor 31 may maintain an overlapping state with the first pattern portion 21. Thus, referring to the 45° rotation position in FIG. 4, corresponding to the second state State 2, the sensing signal S1 of the first sensor 31 may maintain a low level.

After the second state State 2, the first pattern portion 21 may rotate in the direction from the lower side to the upper side, and in a third state State 3, the first sensor 31 may not overlap the first pattern portion 21. Thus, referring to the 90° rotation position in FIG. 4, corresponding to the third state State 3, the sensing signal S1 of the first sensor 31 may be changed to a high level.

After the third state State 3, the first pattern portion 21 may rotate in the direction from the lower side to the upper side, and in a fourth state State 4, the first sensor 31 may still not overlap the first pattern portion 21. Thus, referring to the 135° rotation position in FIG. 4, corresponding to the fourth state State 4, the sensing signal S1 of the first sensor 31 may maintain a high level.

Figure 5A:
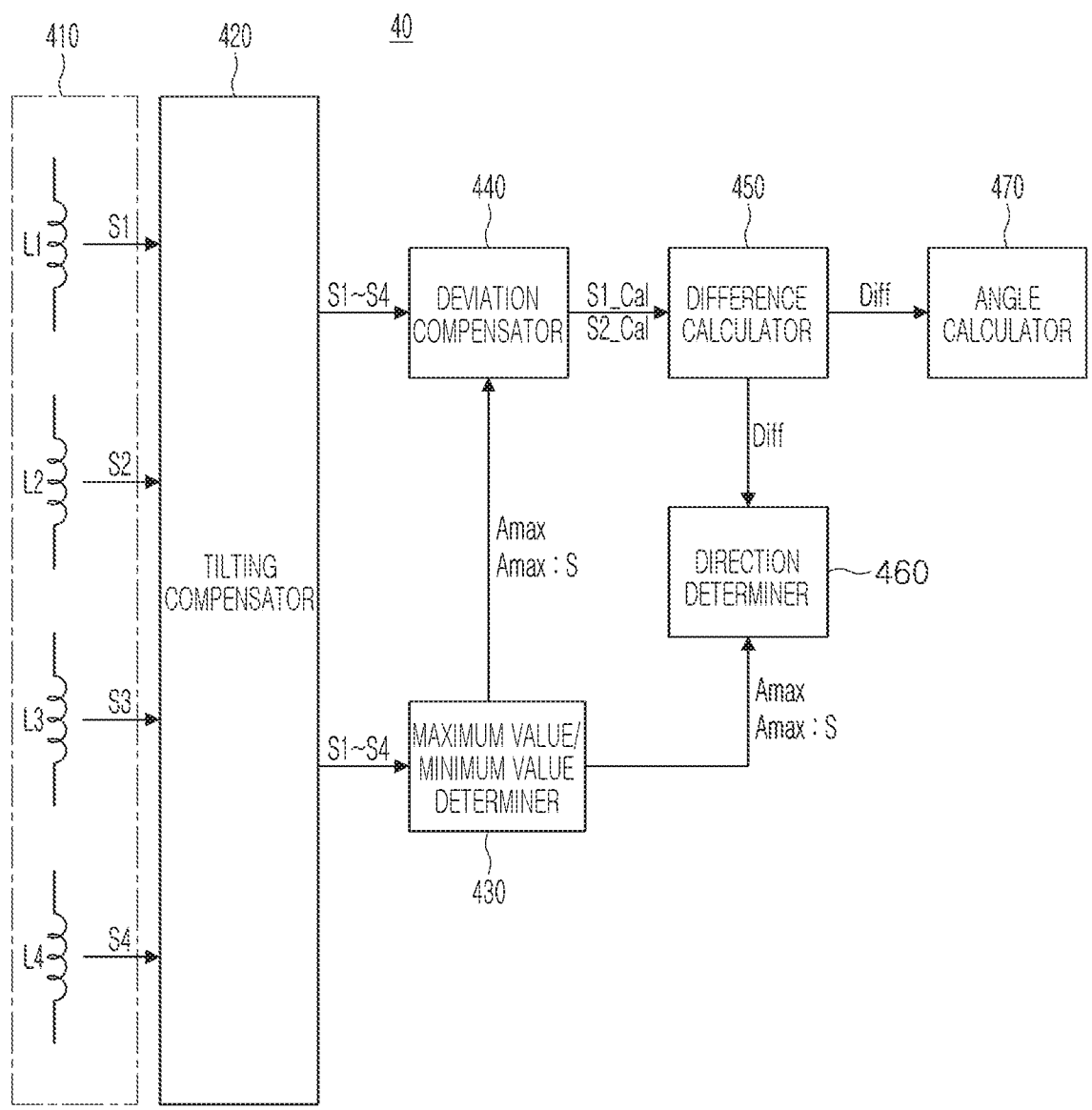
FIG. 5A is a block diagram illustrating a rotation information calculator, according to an embodiment.
Figure 5B:
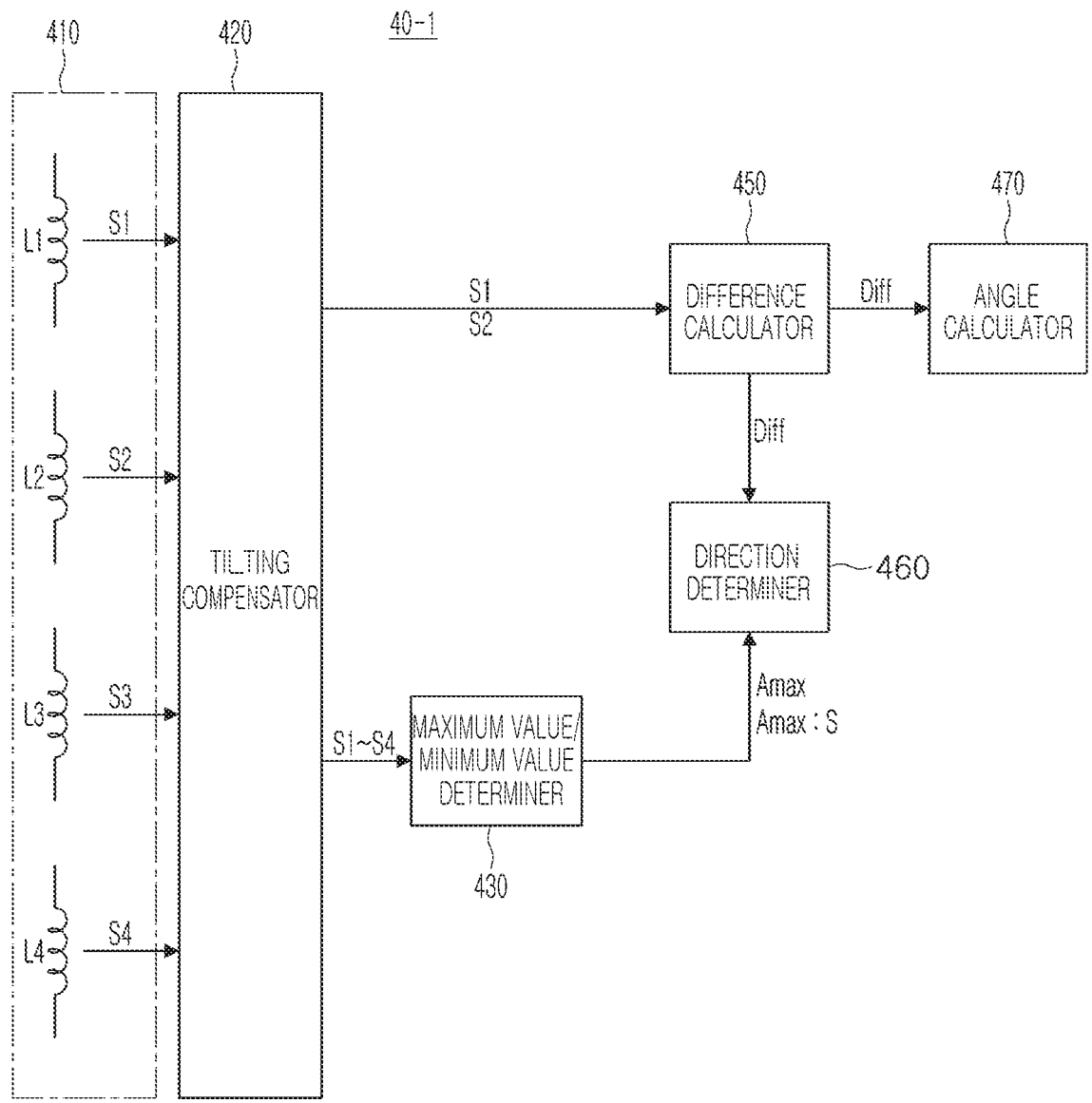
FIG. 5B is a block diagram illustrating a rotation information calculator, according to an embodiment.

FIG. 5A is a block diagram illustrating a rotation information calculator 40 according to an example embodiment. FIG. 5B is a block diagram illustrating a rotation information calculator 40-1, according to an embodiment.

A method of sensing rotation of the apparatus 1/1-1, according to an embodiment, will be described below with reference to FIG. 5A.

Referring to FIG. 5A, the rotation information calculator 40 may include a sensing signal generator 410, a tilting compensator 420, a maximum value/minimum value determiner 430, a deviation compensator 440, a difference calculator 450, a direction determiner 460, and an angle calculator 470.

The sensing signal generator 410 may include the sensing coils L1, L2, L3, and L4 of the first sensor 31, the second sensor 32, the third sensor 33, and the fourth sensor 34, respectively, illustrated in FIGS. 1A, 1B, 2A and 2B. Accordingly, the first sensor 31, the second sensor 32, the third sensor 33, and the fourth sensor 34 may be understood as corresponding to the sensing signal generator 410 illustrated in FIG. 4.

When areas of overlap between the detection target 20 and the first sensing coil L1, the second sensing coil L2, the third sensing coil L3, and the fourth sensing coil L4 change by rotation of the rotator/wheel 10, inductance of the first sensing coil L1, the second sensing coil L2, the third sensing coil L3, and the fourth sensing coil L4 may change. The first sensing coil L1 may output a first sensing signal S1, the second sensing coil L2 may output a second sensing signal S2, the third sensing coil L3 may output a third sensing signal S3, and the fourth sensing coil L4 may output a fourth sensing signal S4.

When the sensing signal generator 410 only includes the first sensing coil L1, the second sensing coil L2, the third sensing coil L3, and the fourth sensing coil L4, the first sensing signal S1, the second sensing signal S2, the third sensing signal S3, and the fourth sensing signal S4 output from the sensing signal generator 410 may correspond to inductance of the first sensing coil L1, the second sensing coil L2, the third sensing coil L3, and the fourth sensing coil L4.

Inductance of the first sensing coil L1, the second sensing coil L2, the third sensing coil L3, and the fourth sensing coil L4 may be an example of a sensing signal. In embodiments, the first sensing coil L1, the second sensing coil L2, the third sensing coil L3, and the fourth sensing coil L4 may be coupled to a variety of elements and may generate a sensing signal.

As an example, the sensing signal generator 410 may further include a first capacitor forming a first oscillator circuit along with the first sensing coil L1 of the first sensor 31, a second capacitor forming a second oscillator circuit along with the second sensing coil L2 of the second sensor 32, a third capacitor forming a third oscillator circuit along with the third sensing coil L3 of the third sensor 33, and a fourth capacitor forming a fourth oscillator circuit along with the fourth sensing coil L4 of the fourth sensor 34. The first to fourth oscillator circuits may be configured as various forms of general LC oscillators.

When the sensing signal generator 410 includes the first to fourth oscillator circuits, a sensing signal output from the sensing signal generator 410 may correspond to an oscillation signal output from the oscillator circuit.

Figure 6:
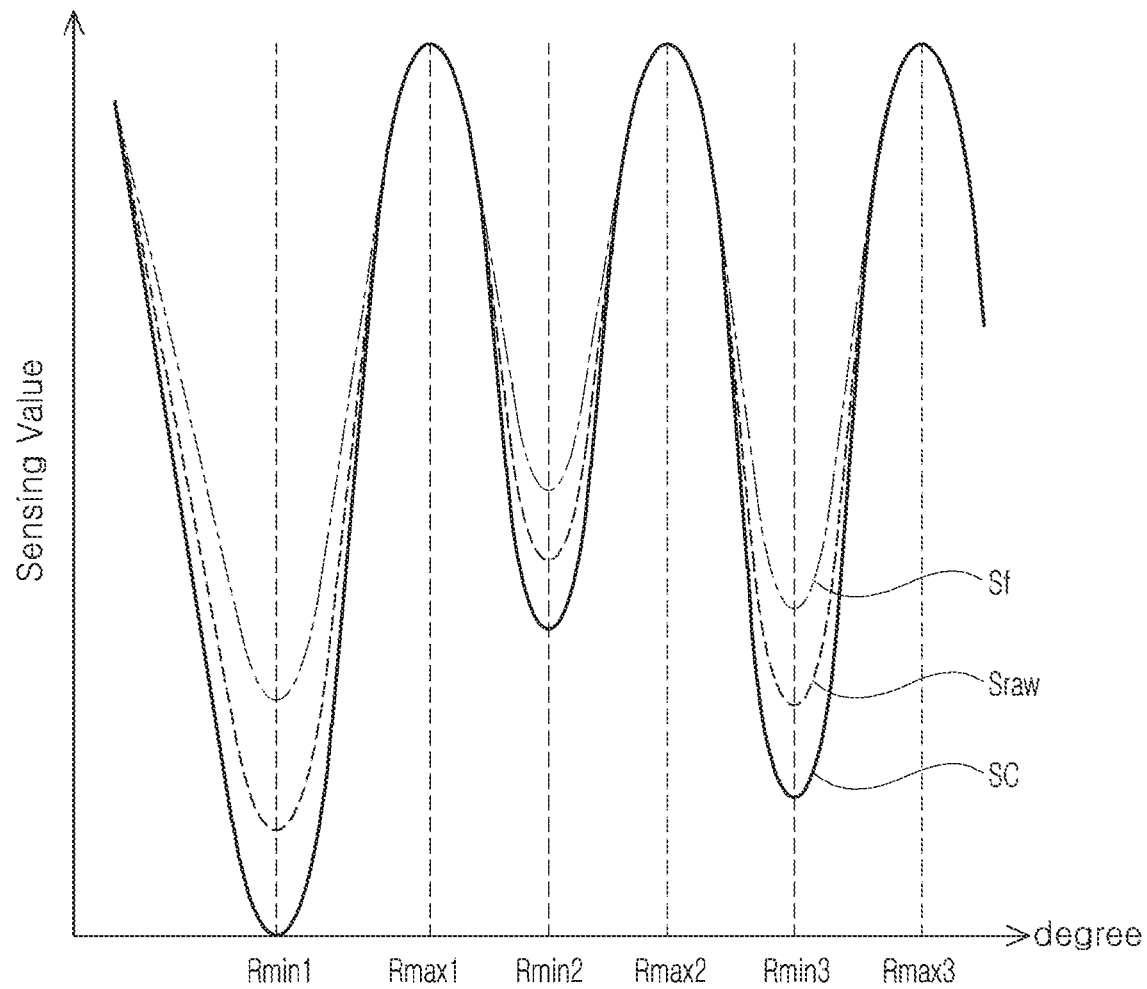
FIG. 6 is a graph illustrating a simulation of a sensing signal in accordance with rotation of a detection target, according to an embodiment.

FIG. 6 is a graph illustrating a simulation of a sensing signal in accordance with rotation of a detection target according to an embodiment.

The simulation graph in FIG. 6 may correspond to the graph of a simulation of a sensing signal output from a sensing coil when a pattern portion includes three patterns each having a size of 60°, a reference angle, as in the embodiment illustrated in FIG. 2B. As an example, as in the embodiment illustrated in FIG. 2B, when a pattern portion 21 includes three first patterns each having a size of 60°, a reference angle, the graph in FIG. 6 may be a graph of a simulation of a first sensing signal S1 output from a first sensing coil L1.

When a user controls a wheel, tilting, a deviation of a detection target from a horizontal or vertical neutral position by force working in an unintended direction that is different from force working in a rotation direction may occur. The tilting may include several types of errors occurring when an apparatus for sensing rotation 1/1-1 is used after the apparatus is released in the market for use in a desired implementation.

In FIG. 6, a first graph indicates a unique sensing signal Sraw generated when tilting has not occurred, and measured at the time at which the apparatus for sensing rotation 1/1-1 is released in the market for use in a desired implementation. A second graph indicates a first tilt sensing signal Sc generated when tilting occurs such that a plurality of patterns become adjacent to a sensing coil. A third graph indicates a second tilt sensing signal Sf generated when tilting occurs such that the plurality of patterns are spaced apart from the sensing coil.

Referring to FIG. 6, by rotation of a detection target, the unique sensing signal Sraw may appear to have a periodic sign wave. Local maximum values Rmax1, Rmax2, and Rmax3 of the unique sensing signal Sraw may indicate that the plurality of patterns overlap the sensing coil, and local minimum values Rmin1, Rmin2, and Rmin3 of the unique sensing signal Sraw may indicate that the plurality of patterns do not overlap the sensing coil.

When the plurality of patterns do not overlap the sensing coil, the local maximum values Rmax1, Rmax2, and Rmax3 may converge to a maximum value by inductance of the sensing coil, and may have the same value.

The local minimum values Rmin1, Rmin2, and Rmin3 may have different values. A deviation among the local minimum values Rmin1, Rmin2, and Rmin3 may be generated by a process error. As an example, a process error may be understood as a difference between a distance between one pattern of the plurality of patterns and the sensing coil, and a distance between another pattern of the plurality of patterns and the sensing coil. The deviation compensator 440 may compensate for a deviation among the plurality of local minimum values Rmin1, Rmin2, and Rmin3.

In the embodiment described above, the local maximum values Rmax1, Rmax2, and Rmax3 of the unique sensing signal Sraw may be the same, and local minimum values Rmin1, Rmin2, and Rmin3 may be different from one another by a process error, but the disclosure herein is not limited to these examples. Depending on a type of sensor used, the local minimum values of the sensing signal may be the same, and the local maximum values may be different from one another. In the description below, when the sensing coil is the most adjacent to the plurality of patterns by rotation of the detection target, a detected local minimum value or a detected local maximum value may be referred to as a peak value, for ease of description.

Referring to FIG. 6, the unique sensing signal Sraw generated in a normal state in which tilting has not occurred and the first tilt sensing signal Sc and the second tilt sensing signal Sf generated when tilting occurs may have similar tendencies, but levels of sensing values of the unique sensing signal Sraw and the first tilt sensing signal Sc and the second tilt sensing signal Sf may be different from each other. Accordingly, it may be necessary to compensate for a difference between the unique sensing signal Sraw and the first tilt sensing signal Sc and the second tilt sensing signal Sf.

The tilting compensator 420 may compensate for a difference between a sensing signal in a normal state in which tilting has not occurred and a sensing signal generated when tilting occurs. In the description below, an operation of tilting compensation of the tilting compensator 420 will be described in greater detail with reference to the first sensing signal S1 for ease of description. The description below may be applied to the second sensing signal S2, the third sensing signal S3, and the fourth sensing signal S4, as well.

Figure 7:
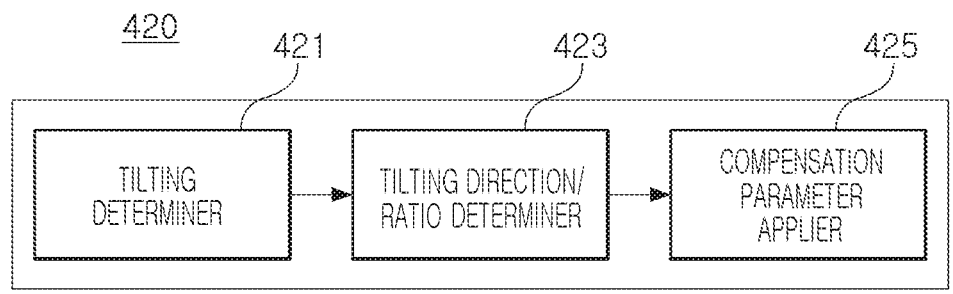
FIG. 7 is a block diagram illustrating a tilting compensator, according to an embodiment.

FIG. 7 is a block diagram illustrating a tilting compensator 420, according to an embodiment.

The tilting compensator 420 may include a tilting determiner 421, a tilting direction/ratio determiner 423, and a compensation parameter applier 425.

The tilting determiner 421 may compare at least one of peak values of the currently measured first sensing signal S1 with a maximum value or a minimum value of reference data.

As an example, when the apparatus for sensing rotation 1-1 is configured as in the embodiment illustrated in FIG. 2B, the first sensing signal S1 measured and output from the first sensing coil L1 of the first sensor 31 may include a first peak value P1, a second peak value P2, and a third peak value P3 when the rotator rotates by a single interval. Also, in example embodiments, when the apparatus for sensing rotation 1-1 is configured as in the example embodiment illustrated in FIG. 2A, the first sensing signal S1 measured and output from a first sensing coil L1 of a first sensor 31 may include two peak values when the rotator rotates by a single interval.

In the description below, an operation of the tilting compensator 420 will be described under the assumption that the first sensing signal S1 includes the first peak value P1, the second peak value P2, and the third peak value P3. The operation of the tilting compensator 420 described below may be applied to a sensing signal including two or four peak values.

The reference data may include unique data and update data. The unique data may be configured as a reference of a first determination on whether tilting has occurred, and the update data may be updated whenever tilting occurs.

The unique data may be compared with any one or more of the first peak value P1, the second peak value P2, and the third peak value P3 of the currently measured first sensing signal S1 when tilting has not occurred before a current operation of determining whether tilting has occurred.

For example, the unique data may include a first unique peak value P1raw, a second unique peak value P2raw, and a third unique peak value P3raw of the first sensing signal S1 measured at the time when the apparatus for sensing rotation 1/1-1 is released in the market for use in a desired implementation.

The update data may be compared with any one or more of the first peak value P1, the second peak value P2, and the third peak value P3 of the currently measured first sensing signal S1 when tilting occurs before a current operation of determining whether tilting has occurred.

For example, the update data may include a first past peak value P1past, a second past peak value P2past, and a third past peak value P3past of the first sensing signal S1 measured at the time when last tilting occurs before a current operation of determining whether tilting has occurred.

In the description below, it will be assumed that a maximum peak value among the first peak value P1, the second peak value P2, and the third peak value P3 of the currently measured first sensing signal S1 may be the first peak value P1, and a minimum peak value among the first peak value P1, the second peak value P2, and the third peak value P3 of the currently measured first sensing signal S1 may be the third peak value P3.

As described above, a sensing signal in a normal state in which tilting has not occurred and a sensing signal in a state in which tilting occurs may have similar tendencies.

Accordingly, similarly to the first peak value P1, the second peak value P2, and the third peak value P3 of the currently measured first sensing signal S1, it will be assumed that a maximum unique peak value among the first unique peak value P1raw, the second unique peak value P2raw, and the third unique peak value P3raw may be the first unique peak value P1raw, and a minimum unique peak value among the first unique peak value P1raw, the second unique peak value P2raw, and the third unique peak value P3raw may be the third unique peak value P3raw. Additionally, a maximum past peak value among the first past peak value P1past, the second past peak value P2past, and the third past peak value P3past may be the first past peak value P1past, and a minimum past peak value among the first past peak value P1past, the second past peak value P2past, and the third past peak value P3past may be the third past peak value P3past.

The tilting determiner 421 may determine whether any one or more of the first peak value P1, the second peak value P2, and the third peak value P3 of the currently measured first sensing signal S1 is greater than a maximum value of the reference data or is less than a minimum value of the reference data.

The tilting determiner 421 may determine that tilting in the first direction occurs when any one or more of the first peak value P1, the second peak value P2, and the third peak value P3 of the currently measured first sensing signal S1 is greater than a maximum value of the reference data. When any one or more of the first peak value P1, the second peak value P2, and the third peak value P3 of the currently measured first sensing signal S1 is less than a minimum value of the reference data, the tilting determiner 421 may determine that tilting taken in a second direction different from the first direction occurs. Otherwise, the tilting determiner 421 may determine that tilting has not occurred.

For example, when tilting has not occurred before a current operation of determining whether tilting has occurred, and any one or more of the first peak value P1, the second peak value P2, and the third peak value P3 of the currently measured first sensing signal S1 is greater than the first unique peak value P1 raw, which is a maximum value among the first peak value P1raw, the second peak value P2raw, and the third peak value P3raw of the unique data, the tilting determiner 421 may determine that tilting in the first direction occurs. When tilting has not occurred before a current operation of determining whether tilting has occurred, and any one or more of the first peak value P1, the second peak value P2, and the third peak value P3 of the currently measured first sensing signal S1 is less than the third unique peak value P3raw, which is a minimum value among the first peak value P1 raw, the second peak value P2raw, and the third peak value P3raw, the tilting determiner 421 may determine that tilting in the second direction occurs.

Also, when tilting occurs before a current operation of determining whether tilting has occurred, and any one or more of the first peak value P1, the second peak value P2, and the third peak value P3 of the currently measured first sensing signal S1 is greater than the first past peak value P1past, which is a maximum value among the first past peak value P1past, the second past peak value P2past, and the third past peak value P3past of the update data, the tilting determiner 421 may determine that tilting in the first direction occurs. When tilting occurs before a current operation of determining whether tilting has occurred, and any one or more of the first peak value P1, the second peak value P2, and the third peak value P3 of the currently measured first sensing signal S1 is less than the third past peak value P3past, which is a minimum value among the first past peak value P1past, the second past peak value P2past, and the third past peak value P3past, the tilting determiner 421 may determine that tilting in the second direction occurs.

As an example, the tilting determiner 421 may include at least one of a resistor and a memory which may record whether tilting has occurred. The tilting determiner 421 may determine whether tilting has occurred before a current operation of determining whether tilting has occurred in accordance with the recorded information of whether tilting has occurred. However, the above-described operation of the tilting determiner 421 is one of examples. The tilting determiner 421 may determine whether tilting has occurred before a current operation of determining whether tilting has occurred in various manners.

When the tilting determiner 421 determines that tilting occurs according to a result of the current operation of determining whether tilting has occurred, the tilting determiner 421 may use the first peak value P1, the second peak value P2, and the third peak value P3 of the currently measured first sensing signal S1 as the update data. In other words, the tilting determiner 421 may update the update data to the first peak value P1, the second peak value P2, and the third peak value P3 of the currently measured first sensing signal S1.

When it is determined that tilting occurs according to a result of the current operation of determining whether tilting has occurred, the first past peak value P1past, the second past peak value P2past, and the third past peak value P3past of the first sensing signal S1 measured at the time when last tilting occurs may be replaced with the first peak value P1, the second peak value P2, and the third peak value P3, respectively, of the currently measured first sensing signal S1.

The update data updated to the first peak value P1, the second peak value P2, and the third peak value P3 of the currently measured first sensing signal S1 may be used as the reference data until subsequent tilting occurs. When subsequent tilting occurs, the update data may be updated by peak values measured at the time when the subsequent tilting occurs.

When the tilting determiner 421 determines that tilting in the first direction occurs, the tilting direction/ratio determiner 423 may determine a tilting direction and a tilting ratio by comparing the first peak value P1, which is a maximum value among the first peak value P1, the second peak value P2, and the third peak value P3 of the currently measured first sensing signal S1, with the first unique peak value P1raw, which is a maximum value among the first unique peak value P1raw, the second unique peak value P2raw, and the third unique peak value P3raw of the unique data.

When the first peak value P1 is greater than the first unique peak value P1 raw, the tilting direction/ratio determiner 423 may determine that tilting in the first direction occurs, and may determine a tilting ratio in accordance with a difference between the first peak value P1 and the first unique peak value P1raw. The tilting ratio may be a ratio of the first unique peak value P1raw to a difference between the first peak value P1 and the first unique peak value P1 raw, and may indicate a degree of distortion of a currently measured sensing signal caused by tilting.

When the first peak value P1 is less than the first unique peak value P1 raw, the tilting direction/ratio determiner 423 may determine that tilting in the second direction occurs, and may determine a tilting ratio in accordance with a difference between the first peak value P1 and the first unique peak value P1raw.

When the tilting determiner 421 determines that tilting in the second direction occurs, the tilting direction/ratio determiner 423 may determine a tilting direction and a tilting ratio by comparing the third peak value P3, which is a minimum value among the first peak value P1, the second peak value P2, and the third peak value P3 of the currently measured first sensing signal S1, with the third unique peak value P3raw, which is a minimum value among the first unique peak value P1raw, the second unique peak value P2raw, and the third unique peak value P3raw of the unique data obtained when the apparatus for sensing rotation 1/1-1 is released in the market for use in a desired implementation.

When the third peak value P3 is less than the third unique peak value P3raw, the tilting direction/ratio determiner 423 may determine that tilting in the second direction occurs, and may determine a tilting ratio in accordance with a difference between the third peak value P3 and the third unique peak value P3raw. The tilting ratio may refer to a ratio of the third unique peak value P3raw to a difference between the third peak value P3 and the third unique peak value P3raw, and may indicate a degree of distortion of a currently measured sensing signal caused by tilting.

When the third peak value P3 is greater than the third unique peak value P3raw, the tilting direction/ratio determiner 423 may determine that a tilting in the first direction occurs, and may determine a tilting ratio in accordance with a difference between the third peak value P3 and the third unique peak value P3raw.

In an example embodiment, the tilting direction/ratio determiner 423 may repeatedly identify a tilting direction determined by the tilting determiner 421 to accurately determine a tilting direction.

When the tilting determiner 421 compares the unique data with the first peak value P1, the second peak value P2, and the third peak value P3 of the currently measured first sensing signal S1, a tilting direction determined by the tilting determiner 421 may be the same as a tilting direction determined by the tilting direction/ratio determiner 423.

When the tilting determiner 421 compares the update data with the first peak value P1, the second peak value P2, and the third peak value P3 of the currently measured first sensing signal S1, a tilting direction determined by the tilting determiner 421 may be the same as or different from a tilting direction determined by the tilting direction/ratio determiner 423. That is because, as an example, even when the first peak value P1 is greater than the first past peak value P1past, the first peak value P1 may be less than the first unique peak value P1 raw.

Thus, the tilting direction/ratio determiner 423 may accurately determine a tilting direction with reference to the first unique peak value P1 raw, the second unique peak value P2raw, and the third unique peak value P3raw of the first sensing signal S1 measured when the apparatus for sensing rotation 1/1-1 is released in the market for use in a desired implementation.

The compensation parameter applier 425 may calculate a compensation parameter in accordance with a tilting direction and a tilting ratio determined by the tilting direction/ratio determiner 423, and may apply the calculated compensation parameter to the currently measured first sensing signal S1, thereby compensating for tilting.

The compensation parameter applier 425 may apply the currently calculated compensation parameter until it is determined that tilting may occur again according to a result of a determination of the tilting determiner 421.

For example, when it is determined that tilting has not occurred according to a result of a determination of the tilting determiner 421 in a first stage after the current stage, the compensation parameter applier 425 may apply the compensation parameter calculated in the current stage to a first sensing signal S1 measured in the first stage after the current stage.

When it is determined that tilting occurs in a second stage after the current stage according to a result of a determination of the tilting determiner 421, the compensation parameter applier 425 may apply a compensation parameter calculated in the second stage after the current stage to a first sensing signal S1 measured in the second stage after the current stage.

In an example, the tilting compensator 420 may control the tilting direction/ratio determiner 423 and the compensation parameter applier 425 to operate in an inactivated state until it is determined that that tilting occurs according to a result of a determination of the tilting determiner 421, thereby reducing power consumption.

Also, in an example, a system resource may be used in an efficient manner using the previously calculated compensation parameter until it is determined that tilting occurs again according to a result of a determination of the tilting determiner 421.

The tilting compensator 420 may provide the first sensing signal S1, the second sensing signal S2, the third sensing signal S3, and the fourth sensing signal S4, having a first compensation parameter applied thereto to compensate for tilting, to each of a maximum value/minimum value determiner 430, a deviation compensator 440, or the like.

Referring back to FIG. 5A, the maximum value/minimum value determiner 430 may determine one of a maximum value Amax and a minimum value Amin of each of time periods in accordance with the first sensing signal S1, the second sensing signal S2, the third sensing signal S3, and the fourth sensing signal S4 provided from the tilting compensator 420. The maximum value/minimum value determiner 430 may also determine a sensing signal Amax:S corresponding to one of the maximum value Amax and the minimum value Amin.

In the description below, an operation of the apparatus for sensing rotation 1/1-1 will be described with reference to the maximum value Amax for ease of description. The description below may be applied to the minimum value Amin as well.

Figure 8:
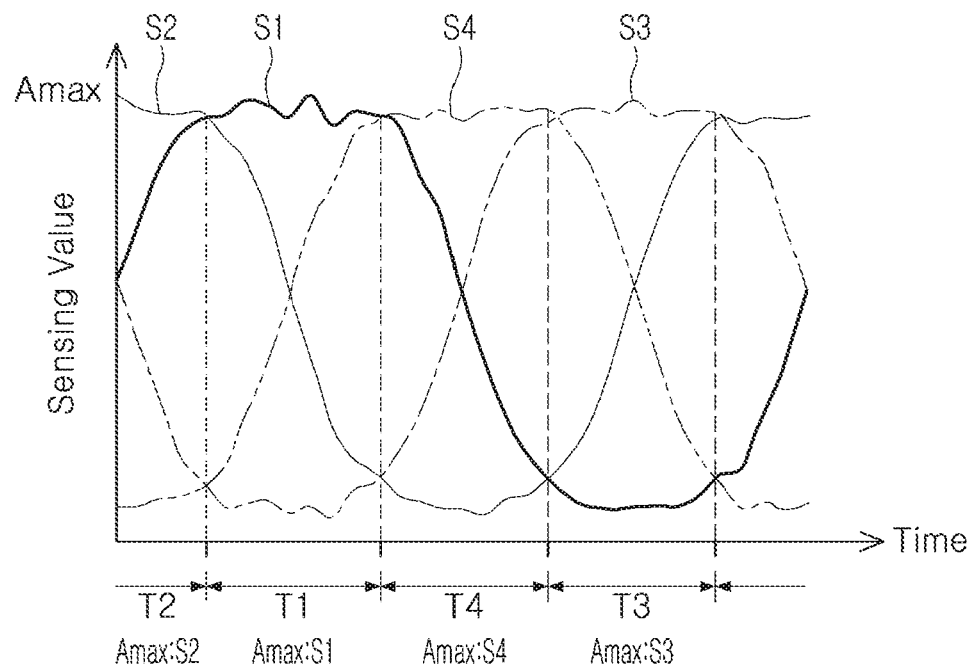
FIG. 8 is a graph illustrating simulations of a first sensing signal, a second sensing signal, a third sensing signal, and a fourth sensing signal, according to an embodiment.

FIG. 8 is a graph illustrating simulations of the first sensing signal S1, the second sensing signal S2, the third sensing signal S3, and the fourth sensing signal S4, according to an embodiment.

When the first sensing signal S1, the second sensing signal S2, the third sensing signal S3, and the fourth sensing signal S4 illustrated in FIG. 8 are provided, a maximum value/minimum value determiner 430 may calculate a maximum value Amax of each time period.

The maximum value/minimum value determiner 430 may also determine a sensing signal corresponding to the calculated maximum value Amax. As an example, the maximum value/minimum value determiner 430 may determine the first sensing signal S1 as a sensing signal Amax: S1 corresponding to a maximum value in a first section T1, may determine the second sensing signal S2 as a sensing signal Amax:S2 corresponding to a maximum value in a second section T2, may determine the third sensing signal S3 as a sensing signal Amax:S3 corresponding to a maximum value in a third section T3, and may determine the fourth sensing signal S4 as a sensing signal Amax:S4 corresponding to a maximum value in a fourth section T4.

Figure 9:
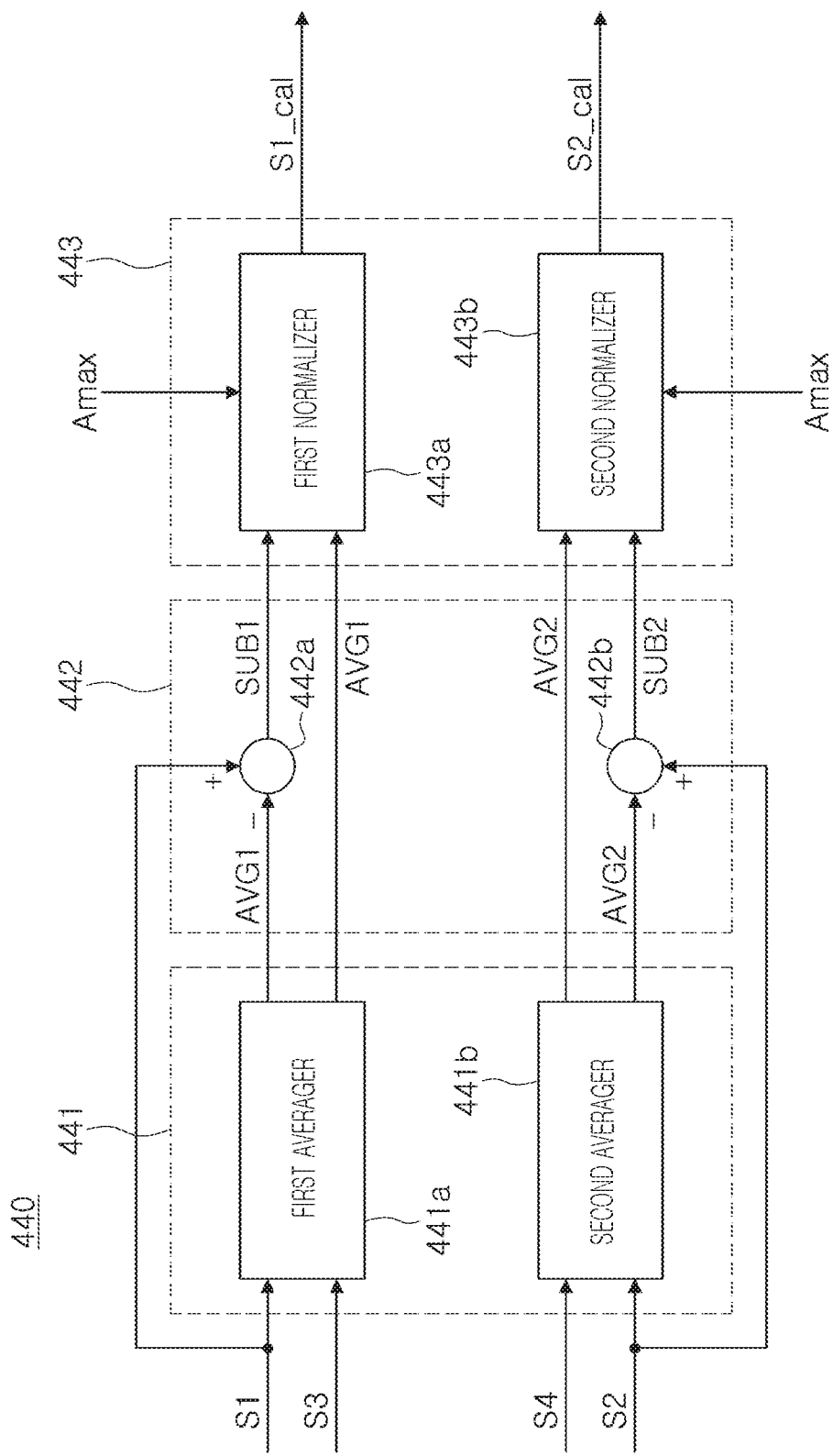
FIG. 9 is a block diagram illustrating a deviation compensator, according to an embodiment.
Figure 10A:
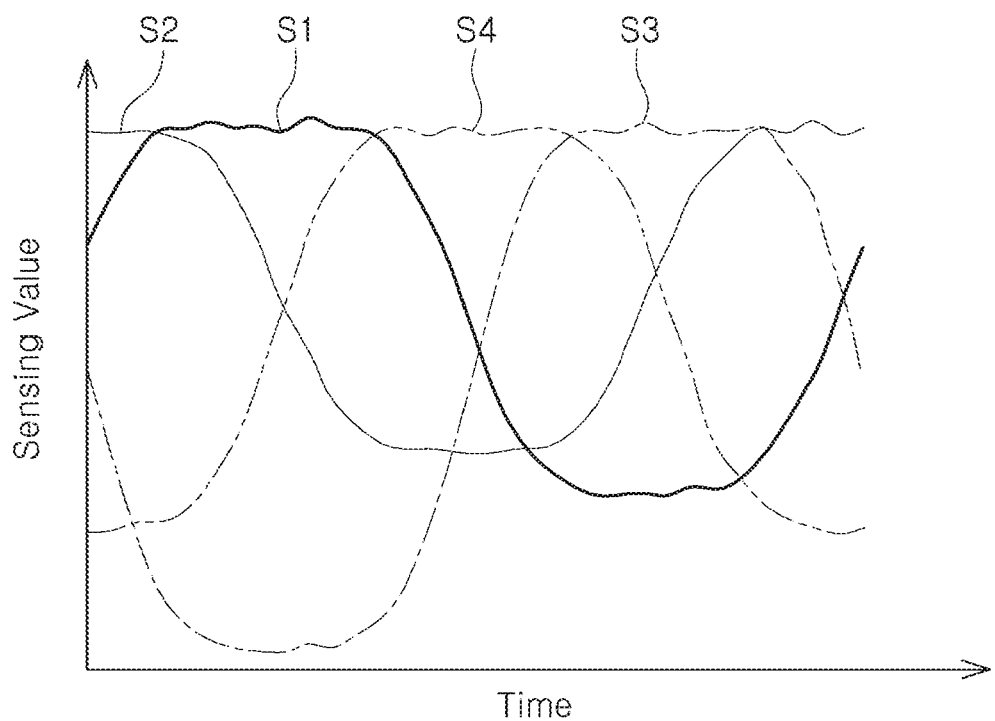
FIG. 10A is a graph illustrating a simulation of a sensing signal in a situation in which a detection target is deviated from a neutral position, according to an embodiment.
Figure 10B:
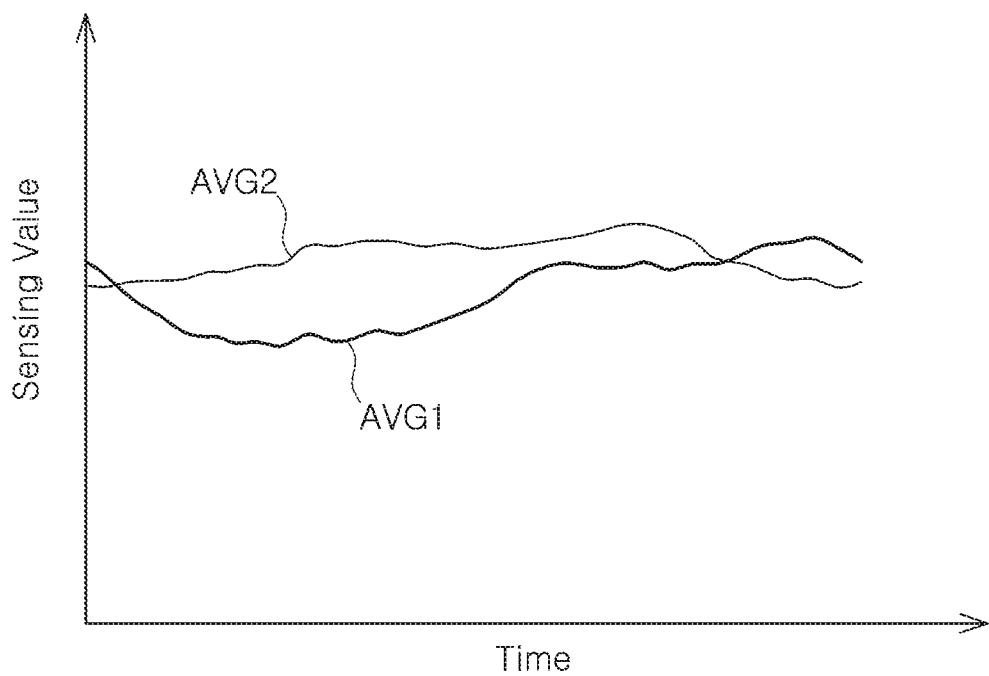
FIG. 10B is a graph illustrating a simulation of average signals, according to an embodiment.
Figure 10C:
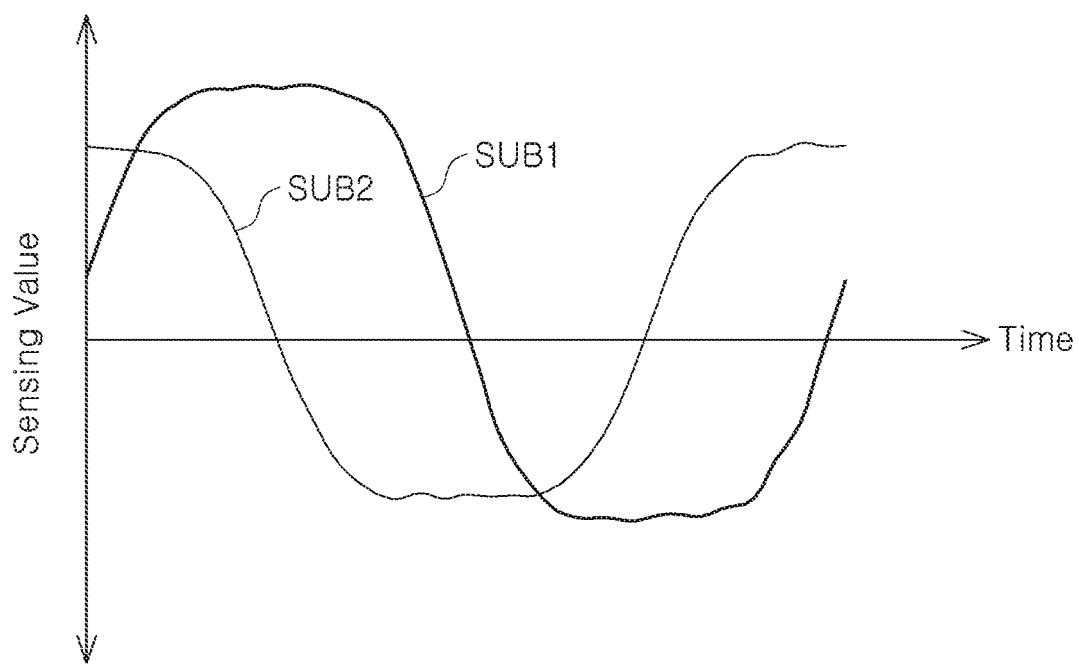
FIG. 10C is a graph illustrating a simulation of subtraction signals, according to an embodiment.
Figure 10D:
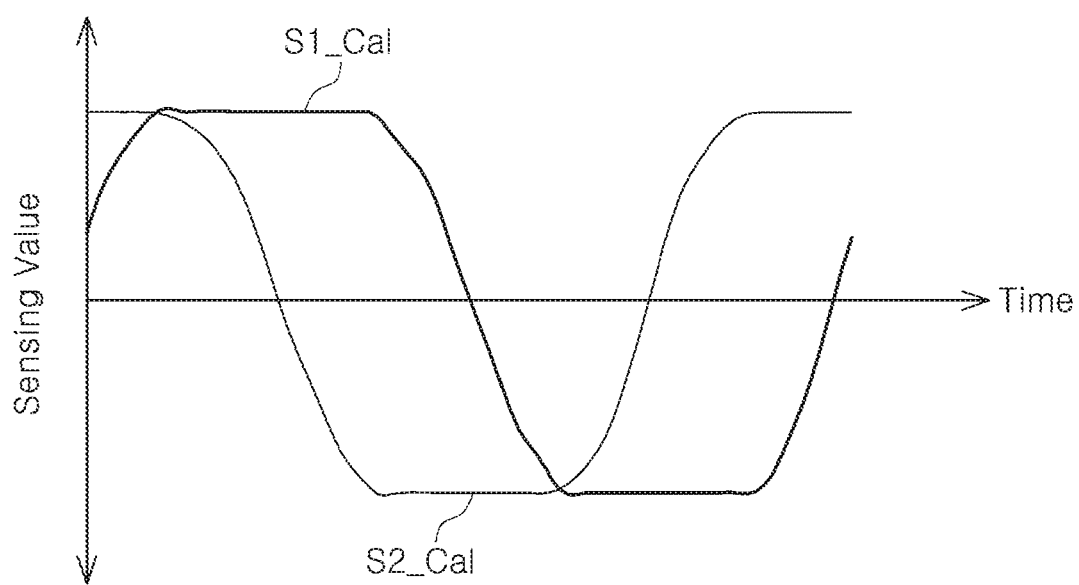
FIG. 10D is a graph illustrating a simulation of adjustment signals, according to an embodiment.

FIG. 9 is a block diagram illustrating the deviation compensator 440, according to an embodiment. FIG. 10A is a graph illustrating a simulation of a sensing signal of when the detection target 20 is deviated from a neutral position, according to an embodiment. FIG. 10B is a graph illustrating a simulation of first and second average signals AVG1 and AVG2, according to an embodiment. FIG. 10C is a graph illustrating a simulation of first and second subtraction signals SUB1 and SUB2, according to an embodiment. FIG. 10D is a graph illustrating a simulation of first and second adjustment signals S1cal and S2cal, according to an embodiment.

A deviation may be produced among peak values of a sensing signal output from a single sensor due to a process error of an angle, a position, and a size of a sensor and a process error caused by a position of a rotary shaft, and a deviation may also be produced between peak values of a sensing signal output from a single sensor and peak values of a sensing signal output from another sensor.

Referring to FIG. 10A, levels of the first sensing signal S1, the second sensing signal S2, the third sensing signal S3, and the fourth sensing signal S4 may change non-uniformly such that sensing sensitivity of the apparatus for sensing rotation 1/1-1 may degrade. Accordingly, it may be necessary to compensate for a deviation among peak values of the sensing signal S1/S2/S3/S4.

The deviation compensator 440 may generate the first adjustment signal S1_cal and the second adjustment signal S2_cal in accordance with the first sensing signal S1, the second sensing signal S2, the third sensing signal S3, and the fourth sensing signal S4. The rotation information calculator 40 may calculate rotation information in accordance with the first adjustment signal S1_cal and the second adjustment signal S2_cal, thereby improving sensing sensitivity.

Referring to FIG. 9, the deviation compensator 440 may include an average signal generator 441, a subtractor 442, and a normalization signal generator 443.

As shown in FIG. 9, the average signal generator 441 may include a first averager 441*a* and a second averager 441*b*. Referring to FIG. 10B, the first averager 441*a* may generate the first average signal AVG1 by averaging the first sensing signal S1 and the third sensing signal S3. The second averager 441*b* may generate the second average signal AVG2 by averaging the second sensing signal S2 and the fourth sensing signal S4.

As shown in FIG. 9, the subtractor 442 may include a first subtractor 442*a* and a second subtractor 442*b*, as shown in FIG. 9.

Referring to FIG. 10C, the first subtractor 442*a* may generate the first subtraction signal SUB1 by subtracting the first average signal AVG1 from the first sensing signal S1.

Still referring to FIG. 10C, the second subtractor 442*b* may generate the second subtraction signal SUB2 by subtracting the second average signal AVG2 from the second sensing signal S2.

As shown in FIG. 9, the normalization signal generator 443 may include a first normalizer 443*a* and a second normalizer 443*b*.

Referring to FIG. 10D, the first normalizer 443*a* may normalize the first subtraction signal SUB1 and may generate the first adjustment signal S1_cal. The first normalizer 443*a* may normalize the first subtraction signal SUB1 in accordance with the first average signal AVG1 and the maximum value Amax. As an example, the first normalizer 443a may generate the first adjustment signal S1_cal in accordance with a ratio of a difference between the maximum value Amax and the first average signal AVG1 to the first subtraction signal SUB1 using Equation 1 below.

$$S1\_cal = \frac{SUB1}{Amax - AVG1} \quad \text{[Equation 1]}$$

Still referring to FIG. 10D, second normalizer 443b may normalize the second subtraction signal SUB2 and may generate the second adjustment signal S2_cal. The second normalizer 443b may normalize the second subtraction signal SUB2 in accordance with the second average signal AVG2 and the maximum value Amax. As an example, the second normalizer 443b may generate the second adjustment signal S2_cal in accordance with a ratio of a difference between the maximum value Amax and the second average signal AVG2 to the second subtraction signal SUB2 using Equation 2 below.

$$S2\_cal = \frac{SUB2}{Amax - AVG2} \quad \text{[Equation 2]}$$

Comparing the graphs in FIG. 10A with the graphs in FIG. 10D, the first sensing signal S1 and the second sensing signal S2 may have a deviation therebetween, whereas the first adjustment signal S1_cal and the second adjustment signal S2_cal may have a constant level.

Thus, the apparatus for sensing rotation in the example embodiment may accurately calculate rotation information of a rotator even when a deviation is produced between levels of sensing signals due to a process error of an angle, a position, and a size of a sensor and a process error caused by a position of a rotary shaft.

Referring back to FIG. 5A, the difference calculator 450 may calculate a difference between the first adjustment signal S1_cal and the second adjustment signal S2_cal and may calculate a differential signal Diff.

Figure 11:
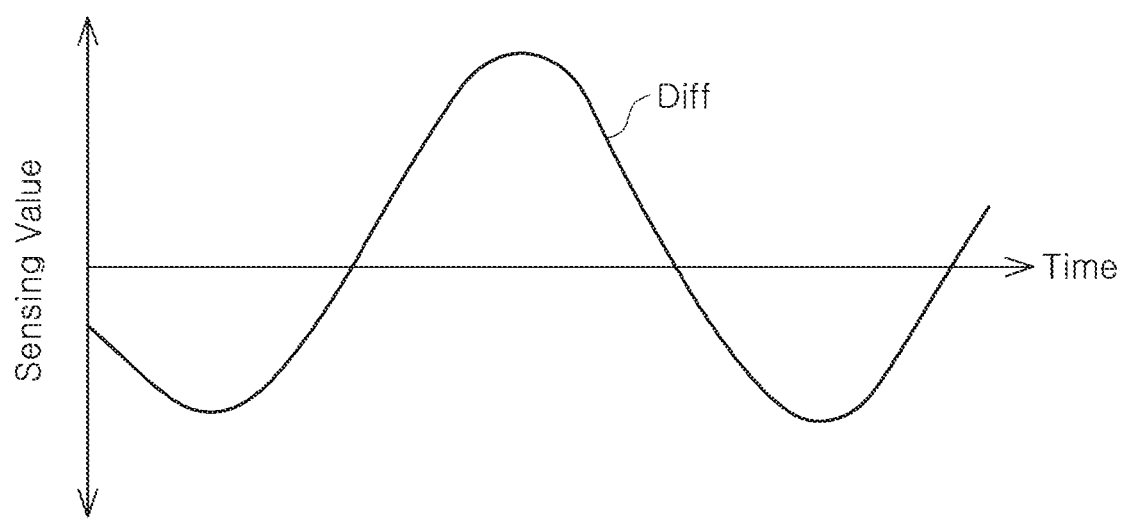
FIG. 11 is a graph illustrating a simulation of a differential signal, according to an embodiment.

FIG. 11 is a graph illustrating a simulation of the differential signal Diff, according to an embodiment. Referring to FIG. 11, the difference calculator 450 may generate a differential signal Diff by differentiating the first adjustment signal S1_cal and the second adjustment signal S2_cal.

Referring to FIG. 5B, the deviation compensator 440 of the rotation information calculator 40 in the example embodiment illustrated in FIG. 5A may not be provided. When the deviation compensator 440 is not provided, the first sensing signal S1 and the second sensing signal S2, instead of the first adjustment signal S1_cal and the second adjustment signal S2_cal, may be provided to the difference calculator 450, and the differential signal Diff may be generated by a difference between the first sensing signal S1 and the second sensing signal S2.

Figure 12A:
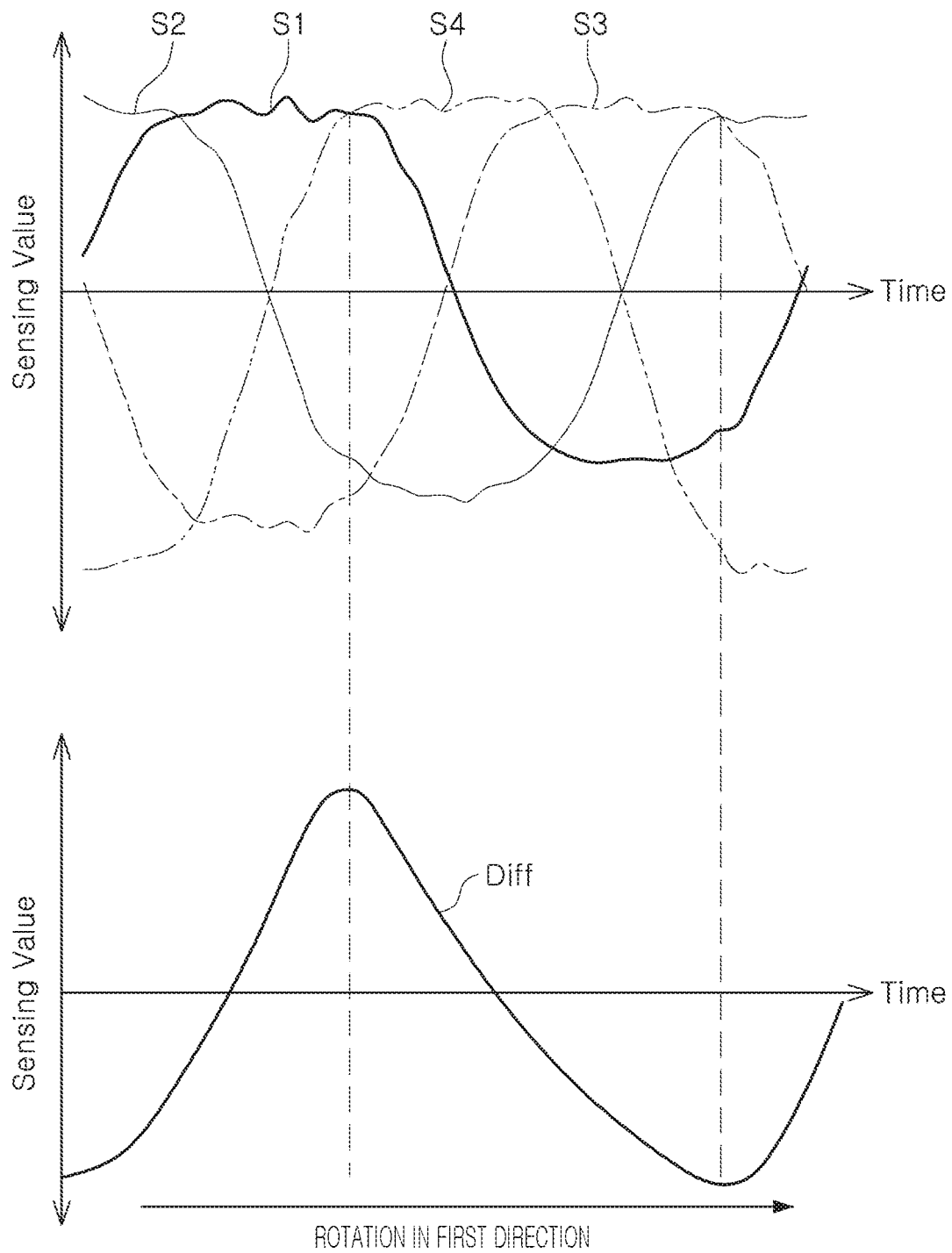
FIG. 12A is a graph illustrating simulations of a first sensing signal, a second sensing signal, a third sensing signal, a fourth sensing signal, and a differential signal, when a rotator rotates in a first direction, according to an embodiment.
Figure 12B:
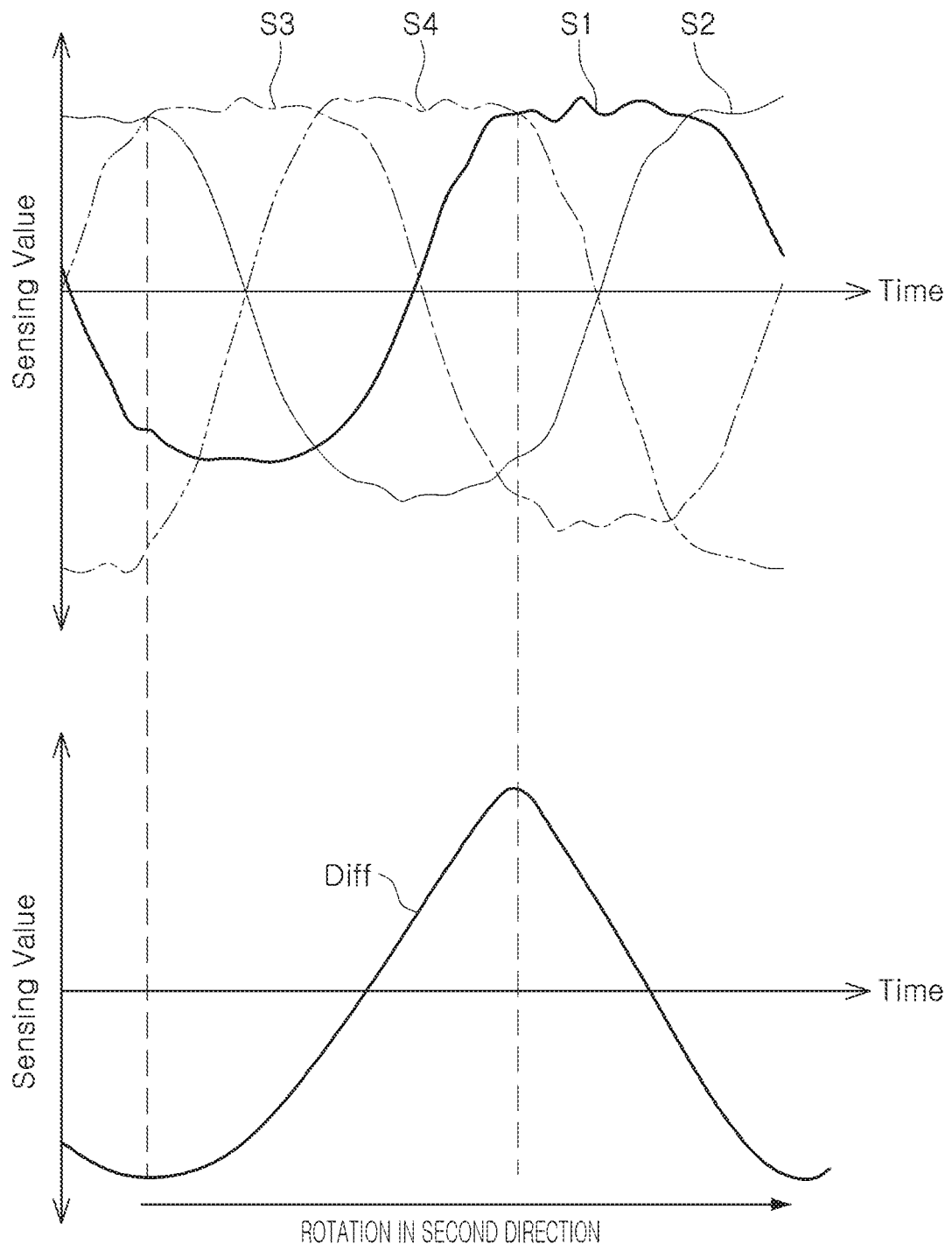
FIG. 12B is a graph illustrating simulations of a first sensing signal, a second sensing signal, a third sensing signal, a fourth sensing signal, and a differential signal, when a rotator rotates in a second direction, according to an embodiment.

FIG. 12A is a graph illustrating simulations of the first sensing signal S1, the second sensing signal S2, the third sensing signal S3, the fourth sensing signal S4, and the differential signal Diff, when a rotator rotates in a first direction, according to an example. FIG. 12B is a graph illustrating simulations of the first sensing signal S1, the second sensing signal S2, the third sensing signal S3, the fourth sensing signal S4, and the differential signal Diff, when a rotator rotates in a second direction, according to an embodiment.

The direction determiner 460 may sense a rotation direction of a rotator in accordance with a sensing signal corresponding to a maximum value and an increasing or decreasing section of the differential signal Diff.

Referring to FIG. 12A, when the rotator rotates in a first direction, and the first sensing signal S1 or the second sensing signal S2 has a maximum value, the differential signal Diff may increase. Also, when the rotator rotates in the first direction, and the third sensing signal S3 or the fourth sensing signal S4 has a maximum value, the differential signal Diff may decrease.

When the rotator rotates in a second direction different from the first direction, and the first sensing signal S1 or the second sensing signal S2 has a maximum value, the differential signal Diff may decrease. Also, when the rotator rotates in the second direction, and the third sensing signal S3 or the fourth sensing signal S4 has a maximum value, the differential signal Diff may increase.

Thus, the direction determiner 460 may determine that the rotator rotates in the first direction when the first sensing signal S1 or the second sensing signal S2 corresponds to a maximum value and the differential signal Diff increases. Also, the direction determiner 460 may determine that the rotator rotates in the first direction when the third sensing signal S3 or the fourth sensing signal S4 corresponds to a maximum value and the differential signal Diff decreases.

In contrast to the above-described example, the direction determiner 460 may determine that the rotator rotates in the second direction different from the first direction when the first sensing signal S1 or the second sensing signal S2 corresponds to a maximum value and the differential signal Diff decreases. Also, the direction determiner 460 may determine that the rotator rotates in the second direction when the third sensing signal S3 or the fourth sensing signal S4 corresponds to a maximum value and the differential signal Diff increases.

Figure 13:
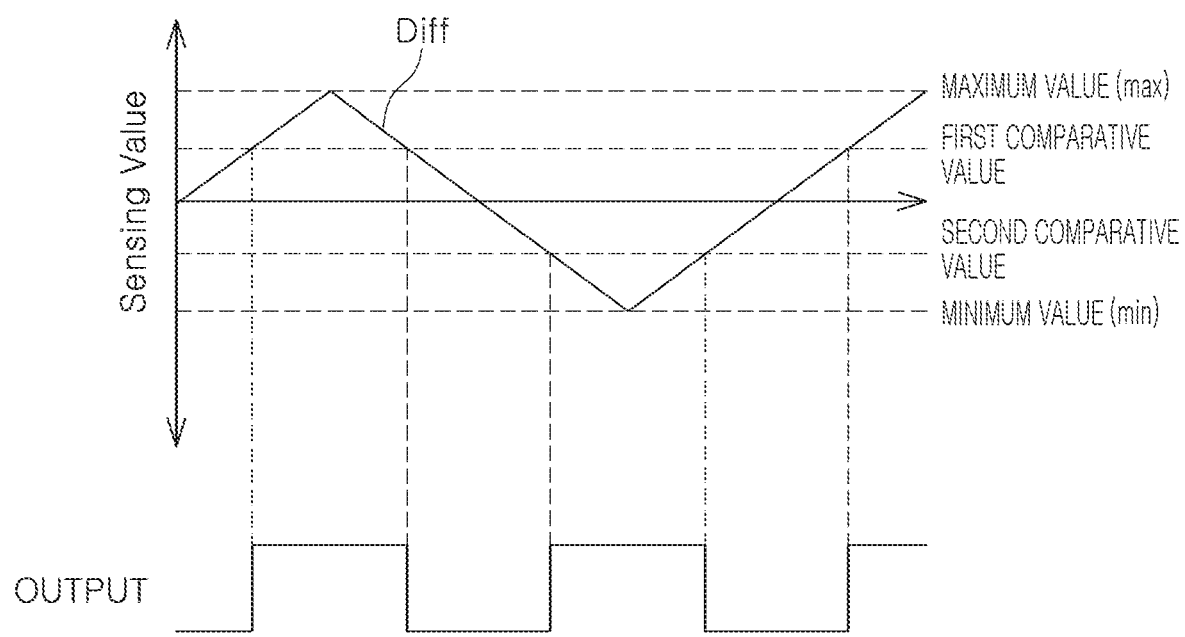
FIG. 13 is a diagram illustrating an operation of angle calculation of an angle calculator, according to an embodiment.

FIG. 13 is a diagram illustrating an operation of angle calculation of the angle calculator 470, according to an embodiment.

Referring to FIGS. 5A and 13, the angle calculator 470 may calculate comparative values in accordance with a target sensing angle and sizes of a first pattern and a second pattern, and may compare the plurality of comparative values with the differential signal Diff, thereby calculating a rotation angle.

In an example, even when the target sensing angle changes or a size of a sensing coil/pattern changes, the angle calculator 470 may calculate the comparative values in accordance with the determined target sensing angle and a size of the sensing coil/pattern, and may compare the calculated comparative values with the differential signal Diff, thereby accurately detecting the target sensing angle.

The comparative values may be positioned within a range between a maximum value Max and a minimum value Min of the differential signal Diff. Differences between adjacent comparative values among the comparative values may be the same, a difference between a maximum comparative value among the comparative values and the maximum value Max of the differential signal Diff may be twice the difference between adjacent comparative values among the comparative values, and a difference between a minimum comparative value among the comparative values and the minimum value Min of the differential signal Diff may be twice the difference between adjacent comparative values among the comparative values.

In FIG. 13, two (first and second) comparative values are illustrated, but the disclosure is not limited to this example.

The number of the comparative values may be determined in accordance with the target sensing angle and a size of a pattern of the detection target 20.

The comparative values may be determined in accordance with the target sensing angle and sizes of a first pattern and a second pattern of the detection target 20. The number of the comparative values may be determined in accordance with a ratio between an angle corresponding to a size of each of the first pattern and the second pattern and the target sensing angle, and levels of the comparative values may be determined by dividing an angle corresponding to a size of each of the first pattern and the second pattern by the target sensing angle.

When a size of the pattern corresponds to 90°, and the target sensing angle is 7.5°, 12(=90/7.5) comparative values may be obtained. By the 12 comparative values (corresponding to 12 levels), 90°, corresponding to a size of the pattern, may be uniformly divided into increments of 7.5°, the target sensing angle.

When a size of the pattern corresponds to 45°, and the target sensing angle is 7.5°, 6(=45/7.5) comparative values may be obtained. By the 6 comparative values (corresponding to 6 levels), 45°, corresponding to a size of the pattern, may be uniformly divided into increments of 7.5°, the target sensing angle.

When a size of the pattern corresponds to 15°, and the target sensing angle is 7.5°, 2(=15/7.5) comparative values (corresponding to 2 levels) may be obtained. By the 2 comparative values, 15°, corresponding to a size of the pattern, may be uniformly divided into increments of 7.5°, the target sensing angle.

The angle calculator 470 may generate an output value OUTPUT by comparing the differential signal Diff with the comparative values. The angle calculator 470 may convert a state of the output value OUTPUT at the time when a level of the differential signal Diff is the same as a level of each of a first comparative value and a second comparative value, and may calculate the output value OUTPUT.

As an example, it may be assumed that two comparative values, the first comparative value and the second comparative value, may be provided from the angle calculator 470, and that the output value OUTPUT is a low level before the output value OUTPUT is compared with the first comparative value. The angle calculator 470 may determine a differential signal Diff greater than the first comparative value as a high level, may determine a differential signal Diff less than the second comparative value as a high level, and may determine a differential signal Diff less than the first comparative value and greater than the second comparative value as a low level, thereby calculating the output value OUTPUT.

The angle calculator 470 may calculate a rotation angle of a detection target based on each of gaps between sections of a high level and a low level of the output value OUTPUT. As an example, the angle calculator 470 may calculate the rotation angle based on gaps between sections of a high level and a low level of the output value OUTPUT.

According to the embodiments described herein, an apparatus for sensing rotation may accurately sense a rotation direction of the rotator by compensating for tilting.

The rotation information calculator 40, the sensing signal generator 410, the tilting compensator 420, the maximum value/minimum value determiner 430, the deviation compensator 440, the difference calculator 450, the direction determiner 460, the angle calculator 470, the tilting determiner 421, the tilting direction/ratio determiner 423, the compensation parameter applier 425, average signal generator 441, the first averager 441a, the second average 441b, the subtractor 442, the first subtractor 442a, the second subtractor 442b, the normalization signal generator 443, the first normalizer 443a, and the second normalizer 443b in FIGS. 5A, 5B, 7, and 9 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An apparatus for sensing rotation, comprising:
   a pattern portion connected to a rotator, and comprising patterns extending in a rotation direction of the rotator;
   a sensor group disposed opposite to the pattern portion, and configured to sense rotation of the rotator; and
   a rotation information calculator configured to calculate rotation information in response to a sensing signal output from the sensor group and measured by the rotation of the rotator during a single interval,
   wherein the rotation information calculator comprises a tilting determiner configured to compare one or more of peak values of the sensing signal with a maximum value of reference data or a minimum value of the reference data, and determine whether tilting currently occurs, based on the comparing of the one or more of peak values of the sensing signal with the maximum value of the reference data or the minimum value of the reference data, and
   wherein the reference data comprises:
      initial data corresponding to a reference of an initial determination of whether tilting has occurred, the initial determination occurring at an initial time before the determining of whether tilting currently occurs, and
      update data that the tilting determiner is configured to update in response to a determination, at any time before the determining of whether tilting currently occurs, that tilting has occurred.

2. The apparatus for sensing rotation of claim 1, wherein the peak values of the sensing signal are detected when the sensor group is closest to each of the patterns.

3. The apparatus for sensing rotation of claim 1, wherein the tilting determiner is further configured to determine that tilting currently occurs, in response to one or more of the peak values of the sensing signal being greater than the maximum value of the reference data or less than the minimum value of the reference data.

4. The apparatus for sensing rotation of claim 3, wherein the tilting determiner is further configured to determine that tilting currently occurs in a first direction, in response to one or more of the peak values of the sensing signal being greater than the maximum value of the reference data, and
   wherein the tilting determiner is further configured to determine that tilting currently occurs in a second direction different from the first direction, in response to one or more of the peak values of the sensing signal being less than the minimum value of the reference data.

5. The apparatus for sensing rotation of claim 3, wherein the tilting determiner is further configured to compare the initial data with the peak values of the sensing signal, in response to tilting having not occurred before the determining of whether tilting currently occurs.

6. The apparatus for sensing rotation of claim 3, wherein the tilting determiner is further configured to compare the update data with the peak values of the sensing signal, in response to tilting having occurred before the determining of whether tilting currently occurs.

7. The apparatus for sensing rotation of claim 6, wherein the update data comprises peak values of a previous sensing signal measured when tilting is lastly measured before the determining of whether tilting currently occurs.

8. The apparatus for sensing rotation of claim 7, wherein the tilting determiner is further configured to update the update data to the peak values of the sensing signal, in response to determining that tilting currently occurs.

9. The apparatus for sensing rotation of claim 8, wherein the determiner is further configured to use the update data updated to the peak values of the sensing signal as the reference data until subsequent tilting occurs.

10. The apparatus for sensing rotation of claim 4, wherein the rotation information calculator further comprises a tilting direction/ratio determiner configured to determine a tilting direction and a tilting ratio by comparing a maximum value of the peak values of the sensing signal with a maximum value of the initial data, in response to tilting currently occurring in the first direction according to a determination result of the tilting determiner, and comparing a minimum value of the peak values of the sensing signal with a minimum value of the initial data, in response to tilting currently occurring in the second direction according to the determination result of the tilting determiner.

11. The apparatus for sensing rotation of claim 10, wherein the tilting direction/ratio determiner is further configured to determine that tilting currently occurs in the first direction, in response to the maximum value of the peak values of the sensing signal being greater than the maximum value of the initial data, and the tilting direction/ratio determiner is further configured to determine that tilting currently occurs in the second direction, in response to the maximum value of the peak values of the sensing signal being less than the maximum value of the initial data.

12. The apparatus for sensing rotation of claim 10, wherein the tilting direction/ratio determiner is further configured to determine the tilting ratio in accordance with a difference between the maximum value of the peak values of the sensing signal and the maximum value of the initial data.

13. The apparatus for sensing rotation of claim 10, wherein the tilting direction/ratio determiner is further configured to determine that tilting currently occurs in the first direction, in response to the minimum value of the peak values of the sensing signal being greater than the minimum value of the initial data, and the tilting direction/ratio determiner is further configured to determine that tilting currently occurs in the second direction, in response to the minimum value of the peak values of the sensing signal being less than the minimum value of the initial data.

14. The apparatus for sensing rotation of claim 13, wherein the tilting direction/ratio determiner is further configured to determine the tilting ratio in accordance with a difference between the minimum value of the peak values of the sensing signal and the minimum value of the initial data.

15. The apparatus for sensing rotation of claim 10, wherein the rotation information calculator is further configured to calculate a compensation parameter in accordance with the tilting direction and the tilting ratio, and apply the compensation parameter to the sensing signal.

16. The apparatus for sensing rotation of claim 15, wherein the rotation information calculator is further configured to apply the compensation parameter to a sensing signal measured after tilting currently occurs, until subsequent tilting occurs.

17. A wearable electronic device comprising the apparatus for sensing rotation of claim 1.

* * * * *